United States Patent
Ortega et al.

(10) Patent No.: US 6,711,162 B1
(45) Date of Patent: Mar. 23, 2004

(54) METHOD AND APPARATUS FOR PROVIDING PROXY SERVICE, ROUTE SELECTION, AND PROTOCOL CONVERSION FOR SERVICE ENDPOINTS WITHIN DATA NETWORKS

(75) Inventors: Douglas F. Ortega, Laytonsville, MD (US); Joseph D. Kralowetz, Clarksville, MD (US)

(73) Assignee: 3Com Corporation, Marlborough, MA (US)

( * ) Notice: Subject to any disclaimer, the term of this patent is extended or adjusted under 35 U.S.C. 154(b) by 0 days.

(21) Appl. No.: 09/547,632

(22) Filed: Apr. 12, 2000

Related U.S. Application Data

(63) Continuation-in-part of application No. 09/177,438, filed on Oct. 21, 1998, which is a continuation-in-part of application No. 09/140,363, filed on Aug. 26, 1998, now Pat. No. 6,618,395, and a continuation-in-part of application No. 09/096,640, filed on Jun. 12, 1998, now abandoned, which is a continuation of application No. 08/845,323, filed on Apr. 25, 1997, now Pat. No. 5,768,525, which is a continuation of application No. 08/525,385, filed on Sep. 8, 1995, now Pat. No. 5,657,452.

(51) Int. Cl.[7] .............................................. H04L 12/28
(52) U.S. Cl. ........................................................ 370/389
(58) Field of Search ................................. 370/389, 400, 370/401, 402, 410, 464, 465, 466, 467, 468, 469, 471, 236, 241, 252; 709/200, 220, 223, 227, 228

(56) References Cited

U.S. PATENT DOCUMENTS

| | | | |
|---|---|---|---|
| 5,657,452 A | 8/1997 | Kralowetz et al. | 395/200.57 |
| 5,768,525 A | 6/1998 | Kralowetz et al. | 395/200.58 |
| 5,781,550 A * | 7/1998 | Templin | 370/401 |

(List continued on next page.)

OTHER PUBLICATIONS

The ATM Forum Technical Committee, "*ATM User–Network Interface (UNI) Signalling Specification*", Version 4.0, dated Jul. 1996, and Addendum dated Jan. 1999.

(List continued on next page.)

*Primary Examiner*—Douglas Olms
*Assistant Examiner*—Ricardo M. Pizarro
(74) *Attorney, Agent, or Firm*—McDonnell Boehnen Hulbert & Berghoff

(57) ABSTRACT

A device, such as an ADSL modem, acts as a proxy for service endpoints in a data network by responding to service endpoint advertisement messages pursuant to Point to Point Protocol (PPP) over Ethernet (PPPoE), where the terminating equipment located at those service endpoints do not support PPPoE services. The device also supports route selection and transparent protocol conversion of network protocols so that a host computer connected to the device can communicate with the service endpoints where the service endpoints do not support the host computer's network protocols (e.g., PPPoE). For example, the device converts PPPoE packets from the host computer to PPP packets and transmits and receives PPP packets with the service endpoint. The invention bridges a huge gap in the existing telecommunications infrastructure. The vast majority of the embedded base of product capable of acting as a service endpoint in the PPPoE protocol (such as the remote access server infrastructure providing dial-up Internet or corporate network access) does not presently support PPPoE protocol, whereas they do support PPP. By providing the proxy service in the device connecting the host computer to the service endpoint (such as a modem, e.g., ADSL modem), the host computer can obtain the benefits of PPPoE with virtually any potential device acting as a service endpoint, since the services provided by PPPoE are supported in the modem acting as a proxy for the service endpoint.

13 Claims, 15 Drawing Sheets

U.S. PATENT DOCUMENTS

| | | | | |
|---|---|---|---|---|
| 6,112,245 | A | * 8/2000 | Araujo | 709/228 |
| 6,118,785 | A | * 9/2000 | Araujo | 370/401 |
| 6,243,394 | B1 | 6/2001 | Deng | 370/466 |
| 6,301,229 | B1 | * 10/2001 | Araujo | 370/252 |
| 6,424,626 | B1 | * 7/2002 | Kidambi | 370/236 |

OTHER PUBLICATIONS

International Telecommunication Union, ITU–T, Recommendation Q–2931, "B–ISDN Application Protocols for Access Signaling" Feb. 1995.

ADSL Forum Contribution, ADSL–98–216, "The Architecture of Extending PPP Connections for Customer Premises LANs", Nov. 1998.

ADSL Forum 98–xxx, "The Architecture for Extending PPP Connections for Home Network Clients", Ver. 1.0 Sep. 1988.

RFC 1483, "Multiprotocol Encapsulation over ATM Adaptation Layer 5", by J. Heinanen, Jul. 1993.

RFC 1661, "The Point–to–Point Protocol (PPP)", W. Simpson, Jul. 1994.

RFC 2363, "PPP Over FUNI", by G. Gross of Lucent Technologies, M. Kaycee of Paradyne, A. Lin of Shasta Networks, A. Malis of Ascend Communications and J. Stephens of Cayman Systems, Jul. 1998.

RFC 2364, "PPP Over AAL5", by G. Gross of Lucent Technologies, M. Kaycee of Paradyne, A. Lin of Shasta Networks, A. Malis of Ascend Communications and J. Stephens of Cayman Systems, Jul. 1998.

RFC 2516, "Method for Transmitting PPP Over Ethernet (PPPoE)", by L. Mamakos, K. Lil and J. Evarts of UUNET Technologies, Inc., D.Carrel and D. Simone of RedBack Networks, Inc. and R. Wheeler of Routerware, Inc., Feb. 1999.

* cited by examiner

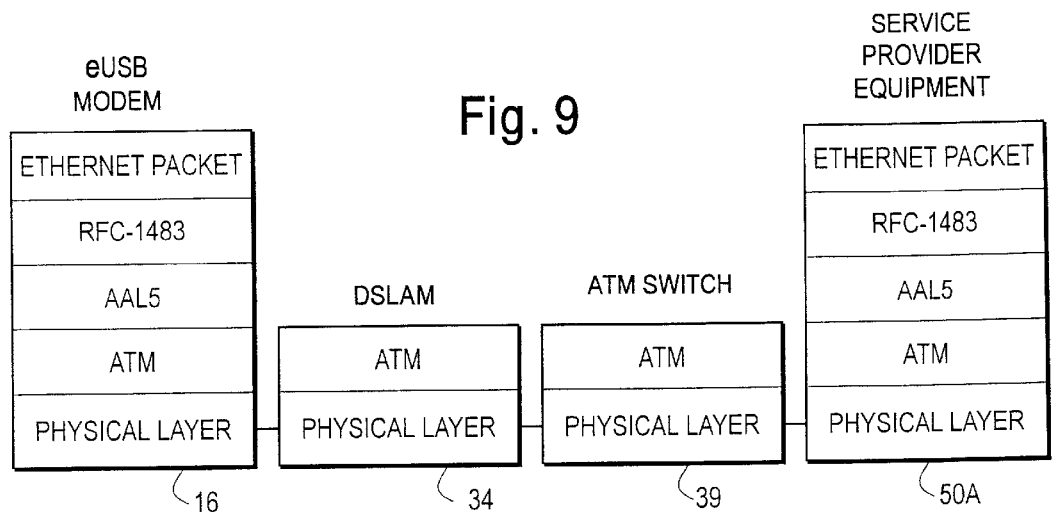
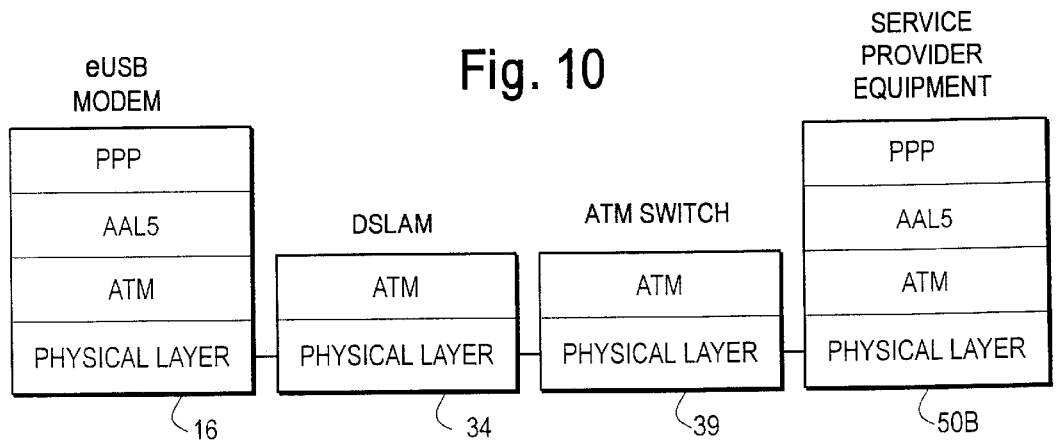
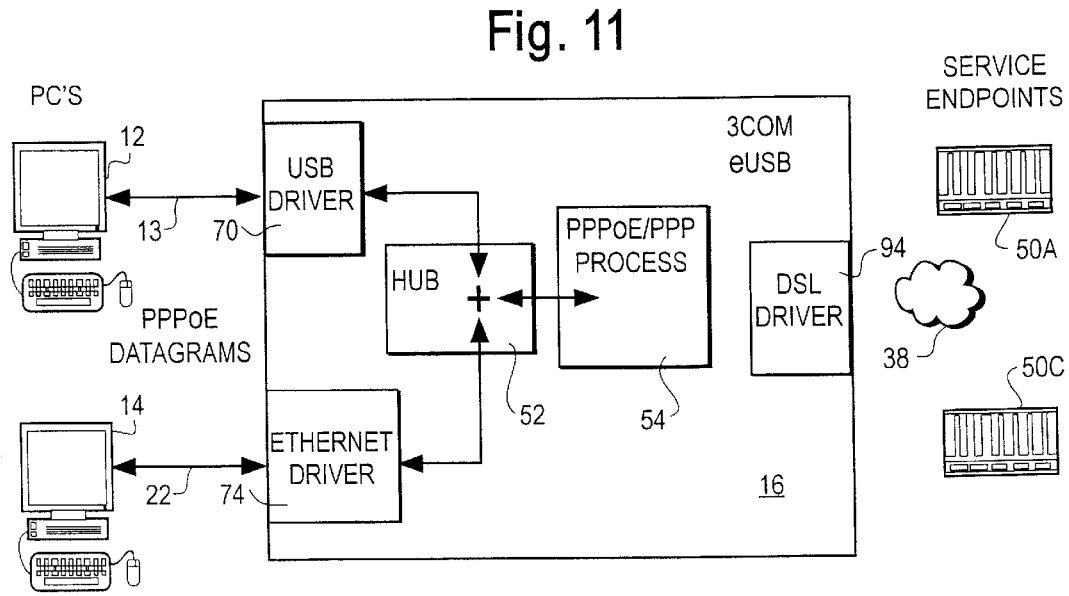

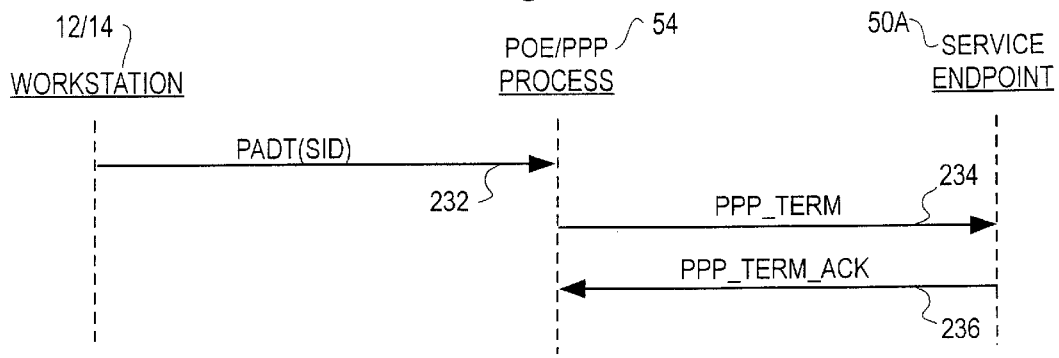
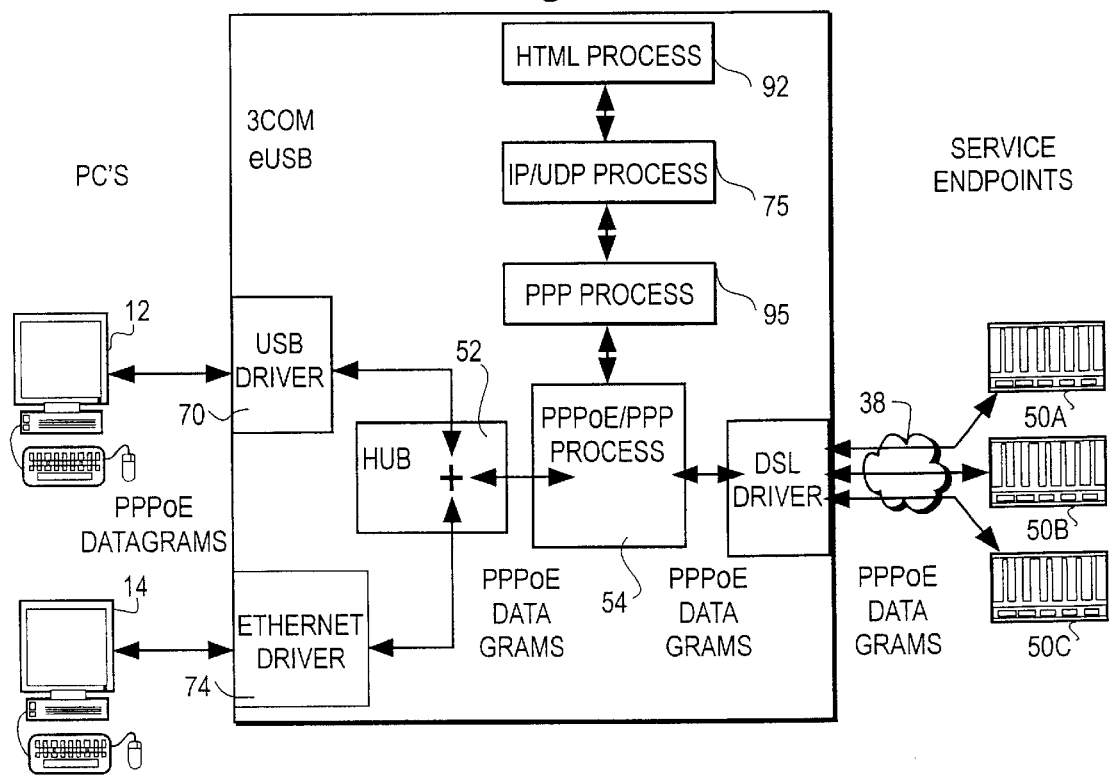
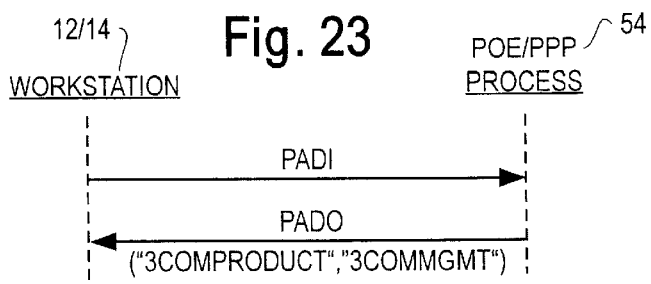

METHOD AND APPARATUS FOR PROVIDING PROXY SERVICE, ROUTE SELECTION, AND PROTOCOL CONVERSION FOR SERVICE ENDPOINTS WITHIN DATA NETWORKS

CROSS-REFERENCE TO RELATED APPLICATIONS

This is a continuation-in-part of the application of David Chiles et al., Ser. No. 09/177,438 filed Oct. 21, 1998, pending, which is a continuation-in-part of the application of David Chiles et al., application Ser. No. 09/140,363 filed Aug. 26, 1998, now U.S. Pat. No. 6,618,395 pending, and a continuation-in-part of the application of Joseph D. Kralowetz, et al., Ser. No. 09/096,640 filed Jun. 12, 1998, now abandoned. application Ser. No. 09/096,640 is a continuation of the application of Joseph D. Kralowetz, et al., Ser. No. 08/845,323 filed Apr. 25, 1997, now U.S. Pat. No. 5,768,525, which is a continuation of application of Joseph D. Kralowetz, et al., Ser. No. 08/525,385 filed Sep. 8, 1995, now U.S. Pat. No. 5,657,452. The entire contents of all of the above applications and patents is fully incorporated by reference herein.

NOTICE REGARDING COPYRIGHT

A portion of the disclosure of this patent document contains material which is subject to copyright protection. The copyright owner has no objection to the facsimile reproduction by anyone of the patent document or the patent disclosure as it appears in the Patent and Trademark Office files and records, but otherwise reserves all copyright rights whatsoever.

BACKGROUND OF THE INVENTION

A. Field of the Invention

This invention relates generally to the subjects of data communication and networking between a host computer and a remotely located service endpoint in a communications network, such as a remote access concentrator connected to the host computer via an Asynchronous Transfer Mode (ATM) network.

More particularly, the invention relates to a method and apparatus for providing proxy service, route selection, and protocol conversion for service endpoints within a data networks that allows the host computer to set up logical connections with the service endpoint, using a protocol such as the Point-to-Point Protocol over Ethernet (PPPOE) protocol.

B. Description of Related Art and Advantages of the Invention

In order for two computers or other items of digital communications equipment to exchange data over a communications medium such as a wide area computer network, both computers have to transmit and receive data in accordance with a set of standards or procedures. These standards or procedures are known as "protocols". As an example, a protocol may assign or designate specific bytes in a packet of data for containing certain information related to the transmission, such as the length of the data, address information, and control characters. Without such protocols, data would be unintelligible to the receiving computer and communication would not be possible. The establishment of protocols enables diverse equipment manufacturers to supply hardware to the public and build computer networks (such as the Internet), with the hardware and networks generally interoperable with equipment of other manufacturers.

The communication industry has standards bodies that formally adopt protocols. Other protocols are "de facto" industry standards, in that the early manufacturers adopt them and other companies selling similar equipment use the same techniques in order to be compatible. As technology advances new standards or protocols are proposed by people working in the industry, often in the form of a "Request for Comment" document, also referred to in the art as an RFC. Persons skilled in the art are familiar with the RFC's.

Over the last few years, new and faster networks have become available for connecting computers together over a local or wide area. Access to such networks to the general public from their personal computer is now becoming available. One example is wide area network access via Asynchronous Transfer Mode (ATM) over Asymmetrical Digital Subscriber Line (ADSL) service.

Companies such as 3Com Corporation, the assignee of the present invention, provide products to provide such access for host computer systems, such as general-purpose computers running a Windows® operating system from Microsoft Corporation. These products can take the form of adapter cards for a computer chassis, and external devices that plug into a port on the computer. Typically, the network routers use a special protocol for encapsulating lower lever protocols when providing wide area network access using ATM over ADSL. One such protocol is described in RFC 1483 "MultiProtocol Encapsulation over ATM Adaptation Layer 5", by J. Heinanen, July 1993. The RFC 1483 document is fully incorporated by reference herein.

Other documents known to persons in the art and considered relevant to the present invention are RFC 1661—The Point to Point Protocol (PPP); RFC 2363—PPP over FUNI; RFC 2364—PPP over AAL5; and RFC 2516—Method of Transmitting PPP over Ethernet (PPPoE), and ADSL Forum Contribution, ADSLF-98-216—The Architecture of Extending PPP Connection Over Customer Premises LAN. The entire contents of each of the above documents are incorporated by reference herein.

In accordance with a representative embodiment of the invention, a device, such as an ADSL modem, acts as a proxy for service endpoints in a data network by responding to service endpoint advertisement messages pursuant to PPPoE, where the terminating equipment located at those service endpoints do not support PPPoE services. The device also supports route selection and transparent protocol conversion of network protocols so that a host computer connected to the device can communicate with the service endpoints where the service endpoints do not support the host computer's network protocols (e.g., PPPoE). For example, the device converts PPPoE packets from the host computer to PPP packets and transmits and receives PPP packets with the service endpoint.

The invention bridges a huge gap in the existing telecommunications infrastructure. Specifically, the vast majority of the embedded base of product capable of acting as a service endpoint in the PPPoE protocol (such as the remote access server infrastructure providing dial-up Internet or corporate network access) does not presently support PPPoE protocol, whereas they do support PPP. By providing the proxy service in the device connecting the host computer to the service endpoint (such as a modem, e.g., ADSL modem), the host computer can obtain the benefits of PPPoE with virtually any potential device acting as a service endpoint, since the services provided by PPPoE are supported in the modem acting as a proxy for the service endpoint.

SUMMARY OF THE INVENTION

In a first aspect, the invention is a method of providing transparent support for a protocol for a remote service endpoint. The illustrated example is PPPoE, but the invention is not so limited. The method includes the feature of implementing a proxy engine (i.e., proxy agent) in a computing platform associated with a host computer system, such as in a modem connected to the host computer system. The proxy engine receives a message from the host computer system in accordance with the protocol, such as a request for identification of services or service endpoints. The message is intended to be transmitted to, and responded by, the remote service endpoint. The invention proceeds on the assumption that the remote service endpoint (e.g. legacy or older generation remote access concentrator) does not have the native support for the protocol. Thus, the proxy engine responds to the message for the remote service endpoint. Hence, the use of the term "proxy"—it acts on behalf of the remote service endpoint. The proxy engine implements a portion of the protocol that was designed or intended to be implemented by the remote service endpoint, such as responding to service inquiries and sending service acceptance messages. Accordingly, the proxy engine provides support for the protocol for the remote service endpoint in a manner transparent to said host computer system. The host computer thinks its messages are being responded to by the remote service endpoint, while in fact the proxy engine is responding to the messages.

In the illustrated embodiment, the proxy engine is implemented in a ADSL modem connected to the host computer system. The particular type of device in which the proxy engine is implemented is not particularly important.

In another aspect, the proxy engine further comprises a packet translation module or engine that converts packets in accordance with the protocol (e.g., PPPoE packets) to a second format in accordance with a second protocol, e.g., PPP packets. This would be performed typically where the remote service endpoint provides support for the PPP, but not the PPPoE.

In another aspect, the invention is a method for providing transparent support for a PPPoE (Point to Point Protocol over Ethernet) protocol for a remote service endpoint. The method comprises the steps of:

(1) sending a query message from a host computer to a data communications equipment (e.g. modem) connected to the host computer seeking the identification of all available service endpoints;

(2) the data communications equipment responding to the query and identifying a service endpoint that can be accessed by the data communications equipment;

(3) initiating a connection between the data communications equipment to the service endpoint;

(4) passing data between the host computer and the service endpoint; and (5) terminating the connection to the service endpoint.

The data communications equipment, in this aspect, acts as the proxy agent or engine on behalf of the remote service endpoint. In the illustrated embodiment, the data communications equipment includes a packet translation module that converts packets from a first form (e.g., PPPoE) to a second protocol form (e.g., PPP).

In still another aspect, the invention comprises an ADSL modem that includes a proxy agent or engine for a remote service endpoint. The modem provides transparent support for the establishment and tear-down of logical connections between the host computer connected to the modem and a remote service endpoint.

These and still other aspects, advantages, and features of the invention will be more apparent from the following detailed description of a presently preferred embodiment of the invention.

BRIEF DESCRIPTION OF THE DRAWINGS

FIG. 2 also shows the eUSB modem's hub and proxy engine features.

FIG. 9 is a diagram of the software protocol stacks involved in bridged RFC 1483 PPPoE service over a Asynchronous Transfer Mode (ATM) connection between the eUSB modem and a remote service endpoint (e.g., remote access concentrator) such as shown in FIG. 2.

FIG. 10 is a diagram of the software protocol stacks involved in a PPP over ATM network between the eUSB modem and a remote service endpoint, such as shown in FIG. 2.

FIG. 11 is a diagram showing the connectivity between Ethernet and USB computers to the ADSL eUSB Modem/hub of FIG. 1, prior to any connection made between the eUSB modem and remote service endpoints.

FIG. 13 thus illustrates one aspect of the proxy feature of the invention, in which the PPPoE process supports PPPoE protocol for the remote service endpoint.

FIG. 21 is an illustration of the message flow for the PPPoE connection termination, showing the PPPoE/PPP process in the eUSB modem acting as a proxy for the service endpoint.

FIG. 22 is an illustration of the eUSB modem of FIG. 1, showing the network management feature provided in the eUSB modem.

FIG. 23 is an illustration of the message flow for a PPPoE management endpoint query message.

DETAILED DESCRIPTION OF THE PREFERRED EMBODIMENT

The proxy features of the present invention are implemented in a modem in the illustrated embodiment. The modem is an ADSL modem in the preferred embodiment. The ADSL modem has a number of different features, including the proxy feature, a hub feature, a management feature, and a switched virtual circuit connection feature. The modem is described generally in Section I of this document, as is the proxy feature of the present invention. Detailed software and hardware features of the modem are described in the following sections in order to describe the best mode known for practicing the invention and for the sake of completeness of the discussion. The additional features provided by the modem are discussed towards the end of this document in Section V.

I. Overview of eUSB Modem
A. General Discussion, Including Hub Feature

Figure 1:
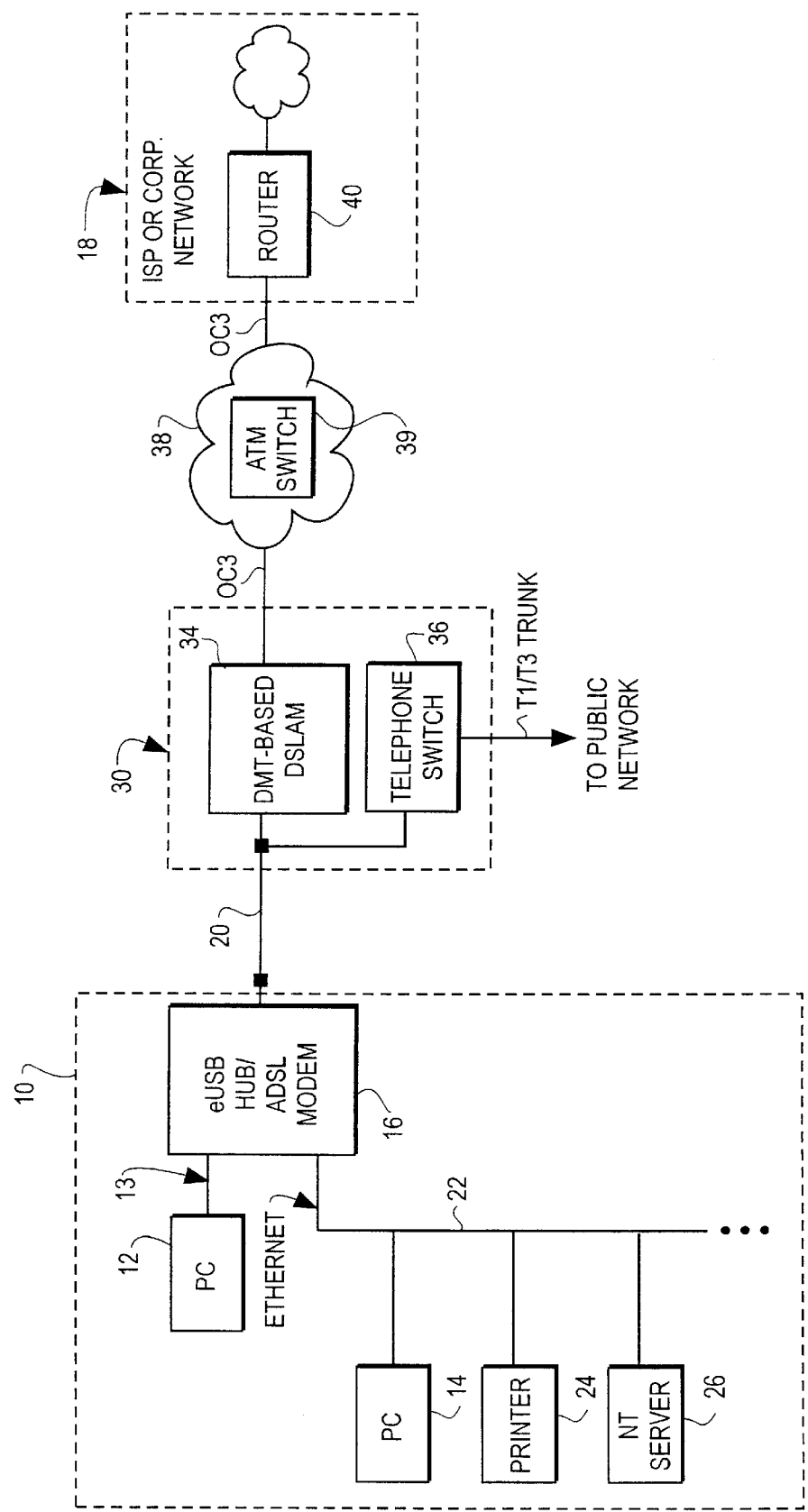
FIG. 1 is a schematic representation of a system including a USB-connected personal computer and an Ethernet-connected personal computer that are connected together by means of a combined Ethernet and USB ADSL modem (referred to as the "eUSB modem" herein). The eUSB modem includes a software and hardware "hub" that allows the personal computers to share files and attached peripheral devices. It also contains hardware and software for providing high-speed ADSL access to an internet service provider or corporate local area network via twisted pair copper telephone loop and associated telephone company network. In the embodiment of FIG. 1, proxy service aspect of the invention is implemented in the eUSB ADSL modem.

Referring now to FIG. 1, an overview of one representative environment in which the invention may be practiced is shown in a schematic form. FIG. 1 shows a home, small office or branch office 10 which includes a USB-connected personal computer 12 and an Ethernet-connected personal computer 14 that are connected together by means of a combined Ethernet and USB ADSL modem 16 (referred to as the "eUSB modem" herein). A USB bus 13 connects the USB computer 12 to the eUSB modem 16. The eUSB modem 16 includes a software and hardware "hub" that allows the personal computers 12 and 14 to share files and attached peripheral devices. It also contains hardware and software for providing high-speed ADSL access to an Internet service provider or corporate local area network 18 via a twisted pair copper wire and telephone company equipment. In the embodiment of FIG. 1, the proxy service feature of the invention is implemented in the ADSL eUSB modem 16.

The Ethernet computer 14 is located on a 10 BaseT Ethernet network 22, which also includes a printer 24, a Windows NT server 26, and possibly other computing devices or peripherals, the details of which are not important. As described below, a hub feature implemented in the eUSB modem 16 allows the USB computer 12 to access any of the devices on the Ethernet network 22, and vice versa.

The eUSB modem is linked to a telephone company central office 30 via the twisted pair loop 20. The telephone company central office includes, among other things, a DMT-based Ho Digital Subscriber Line Access Multiplexer (DSLAM) 34 and a telephone switch 36. The telephone switch 36 allows voice calls to be routed over a T1/T3 trunk to the public switched telephone network. The function of the DSLAM 34 is to terminate all the remote ADSL modems and routers into a single location and send the data traffic out to the Internet or another remote destination. The DSLAM aggregates the data received from the residential or business locations and backhauls the data over higher density interfaces (typically DS3 or OC3) into the core of the network, such as an Asynchronous Transfer Mode (ATM) network 38 having one or more ATM switches 39. The ATM network is connected to the Internet Service Provider (ISP) network 18 by means of a router 40.

The eUSB modem 16 is an ADSL to 10 Base-T and/or USB bridge, with a single 10 base-T port and a USB port. It combines bridge software, a discrete multi-tone (DMT) ADSL modem, compliant to Issue 2 of the T1.413 standard, and local interfaces (10 BaseT Ethernet and/or USB) to provide a high speed ADSL access to a ATM network. The product is particularly well suited for the home, home office or small office environment.

The eUSB modem 16 functions as an ATM User Network Interface (UNI), adhering to the ATM Forum's "*ATM UNI Specification, Version 3.1*". The ADSL Modem in the device is implemented using an Alcatel Microelectronics MTC20144 chipset. In the illustrated embodiment, there is no support for routing of analog voice calls, however, ADSL is capable of handling Plain Old Telephone Service (POTS) traffic. An external POTS splitter can be used to extract the analog data. The POTS splitter functionality can be developed by persons skilled in the art.

ADSL service is an "always on" connection that enables high-speed (up to 8 Mbps downstream and up to 1 Mbps upstream) transmission of data and voice over ordinary copper wires. ADSL connections are length-dependent, that is the end-user must be within 18,000 feet of the telephone company's central office.

The eUSB modem 16 further provides ADSL service for the USB and Ethernet computers 12 and 14. The eUSB modem 16 combines the data streams from the computers 12 and 14, and presents it as a single data stream to network layer processes in the eUSB modem. The eUSB modem supports various networking protocols, including IP, IPX, and PPPoE. The eUSB provides a protocol proxy service for remote service endpoints where needed, as described later in this document.

ADSL Full Rate, also known as the ITU standard G.dmt (G.992.1) supports transmission of up to 8 Mbps downstream and 1 Mbps upstream. ADSL Full Rate requires installation of a POTS (Plain Old Telephone Service) splitter at the customer premise. The POTS splitter separates the bandwidth on the telephone line so the voice and data traffic do not interfere with each other.

ADSL Lite, also known as the ITU standard G.lite (G.992.2) supports ADSL transmission of up to 1.5 Mbps downstream (equivalent to T1) and up to 512 Kbps upstream, ADSL Lite does not require a POTS splitter at the customer premise. The preferred embodiment of the eUSB ADSL Modem is both G.dmt and G. Lite standards-compliant.

The ".dmt" in G.dmt stands for Discrete Multi-Tone line modulation. DMT describes a version of multi-carrier modulation in which incoming data is collected and then distributed over a large number of small individual carriers called bins. DMT creates these channels using a digital technique known as Discrete Fast-Fourier Transform. DMT is the basis of ITU-T Recommendation G.dmt, now G.992.1, and a new ANSI standard T1.413, Issue 2. For additional information on DMT, the reader is directed to the ADSL Forum web site, http://www.adsl.com/.

Figure 2:
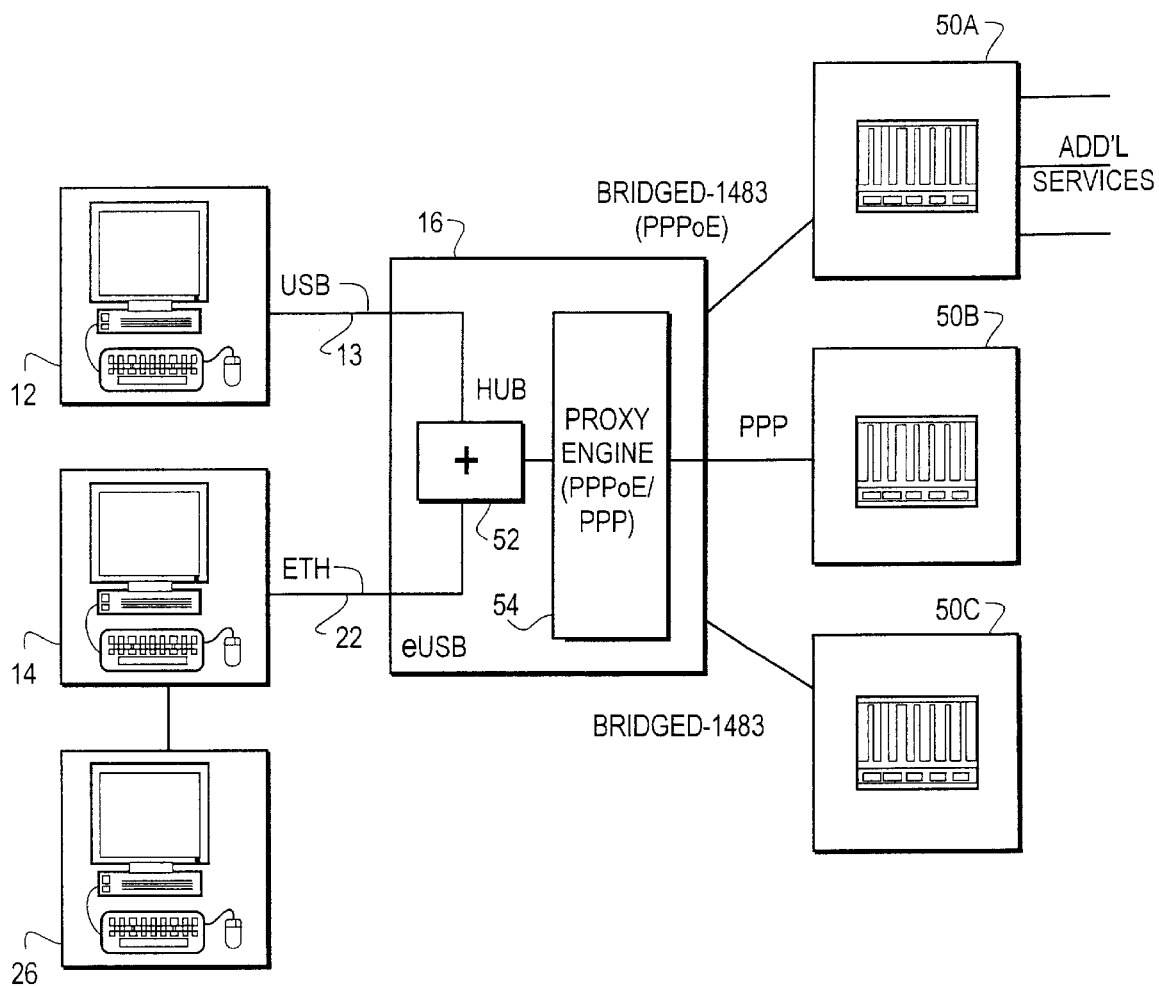
FIG. 2 is another schematic diagram showing the eUSB modem in further detail, with the eUSB modem providing both bridged RFC 1483 (PPPoE) and PPP connections to remote service endpoints, represented as remote access servers in the Figure.

FIG. 2 is another schematic diagram showing the eUSB modem in further detail, showing the eUSB modem providing both bridged Request for Comments (RFC) 1483 multiprotocol encapsulation over ATM network and PPP connections to remote service endpoints, represented as remote access servers 50A–50C in the Figure. The remote access servers 50A–50C typically sit at the edge of the public switched telephone network and provide routing and modem functions and allow computers making dial-up PPP connections over the telephone network to engage in bilateral communication with computers on a packet switched network (indicated by the legend "add'l services" in FIG. 2). The remote access servers of FIG. 2 are known in the art and available from companies such as 3Com Corporation and Lucent Technologies. FIG. 9 illustrates the protocol stacks involved with bridged-RFC 1483 connections, and FIG. 10 illustrates the protocol stacks for PPP connections.

FIG. 2 also shows the software architecture of eUSB modem 16 in some further detail. Basically, the eUSB modem includes a hub process 52 and a proxy engine 54. The proxy engine 54 (referred to herein alternatively as the PPPoe/PPP process) supports the PPPoE protocol (or other new networking protocol) on behalf of remote access servers 50A, 50B or 50C that do not provide native support for the PPPoE protocol. The hub process 52 allows the packets from the USB computer 12 to be directed to the Ethernet computer 14 when just the hub function is implemented. The hub process 52 further aggregates the data stream from both computers 12 and 14 and presents it as a single stream to network layer protocol processes in the eUSB modem. The network layer protocol processes, e.g., IP and PPPoE, are typically involved in the transmission of data between the Ethernet and USB computers and remote computers via the ADSL interface and the remote service endpoints.

Figure 3:
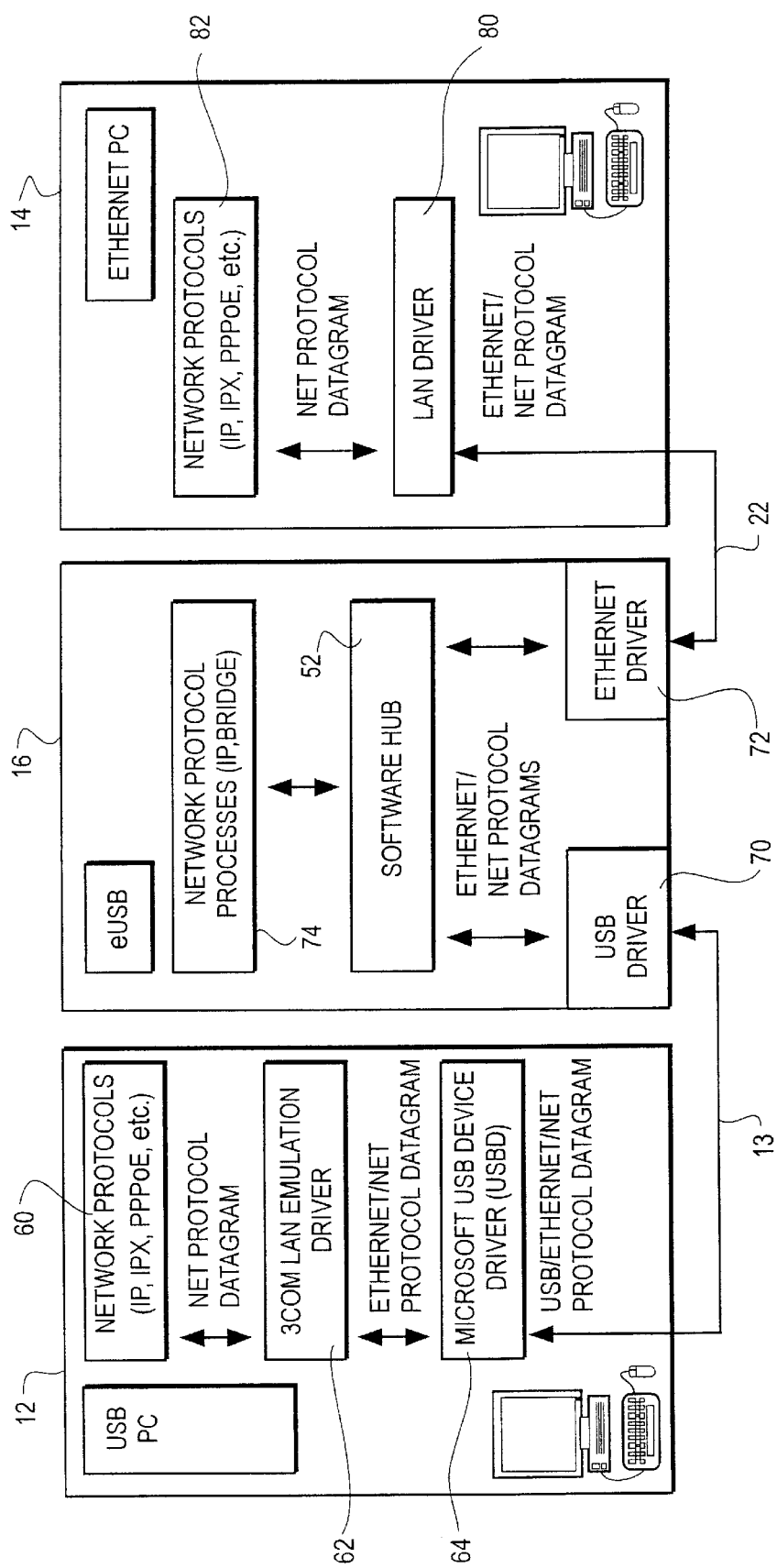
FIG. 3 is a software block diagram showing the data flow between the Ethernet and USB connected computers of FIGS. 1 and 2.

FIG. 3 is a software block diagram showing the data flow between the Ethernet and USB connected computers of FIGS. 1 and 2. The USB computer 12 has a set of network protocol applications 60, such as IP, IPX, PPPoE, etc., which receive data from higher level applications and pass network protocol datagrams down to a LAN emulation driver 62. The LAN emulation driver 62 is a set of instructions that is loaded on to the USB computer from an installation disk provided when the user purchases the hub/eUSB modem 16 of the present invention. In the present example, the operating system in the USB computer includes a Windows-based networking application (e.g., Microsoft Networking) that passes Ethernet packets to the LAN emulation driver 62. The LAN emulation driver prepends a proprietary (i.e, unique to 3Com in the illustrated embodiment) USB packet header to the Ethernet packet. The LAN emulation driver also re-directs the Ethernet packet (with the 3Com USB packet header) to the operating systems' USB device driver 64. The USB device driver 64 transmits the USB/Ethernet protocol datagrams in the form of USB cells over the USB medium 13 to the eUSB modem/hub 16.

The USB cells from USB-connected computer 12 are received at a USB port in the eUSB modem/hub 16 and sent to a USB device driver 70. The USB device driver 70 reassembles the Ethernet packet with the 3Com USB packet header, strips off the 3Com USB packet header leaving the Ethernet packet as originated by the network protocol process 60 in the USB-connected computer, and passes the Ethernet packet up to the software hub process 52. The software hub process 52 either directs the packet out the peer interface (in this case the Ethernet interface via the Ethernet driver 72), or passes the packet up to network protocol processes 74. The software hub process 52 also aggregates the data stream from both the Ethernet driver 72 and the USB driver 70 and presents it as a single data stream to the network protocol process 74.

Assuming now that the Ethernet/USB packets received by the USB driver 70 from the i USB computer 12 are intended for the Ethernet computer 14, the software hub 52 sends the packet down to the Ethernet driver 72 for transmission over the Ethernet network 22 to the Ethernet computer 14. The Ethernet datagram is sent to a LAN driver 80 and passed up to network protocol processes 82 in the computer 14 and sent up to application layer programs for ultimate processing. For example, these application layer programs could be word processing programs, spread sheets, printing programs, or any other application common to both the USB computer and the Ethernet computer to allow the two computers to share files, attached peripherals, etc., as if both computers were on a common network.

Figure 4:
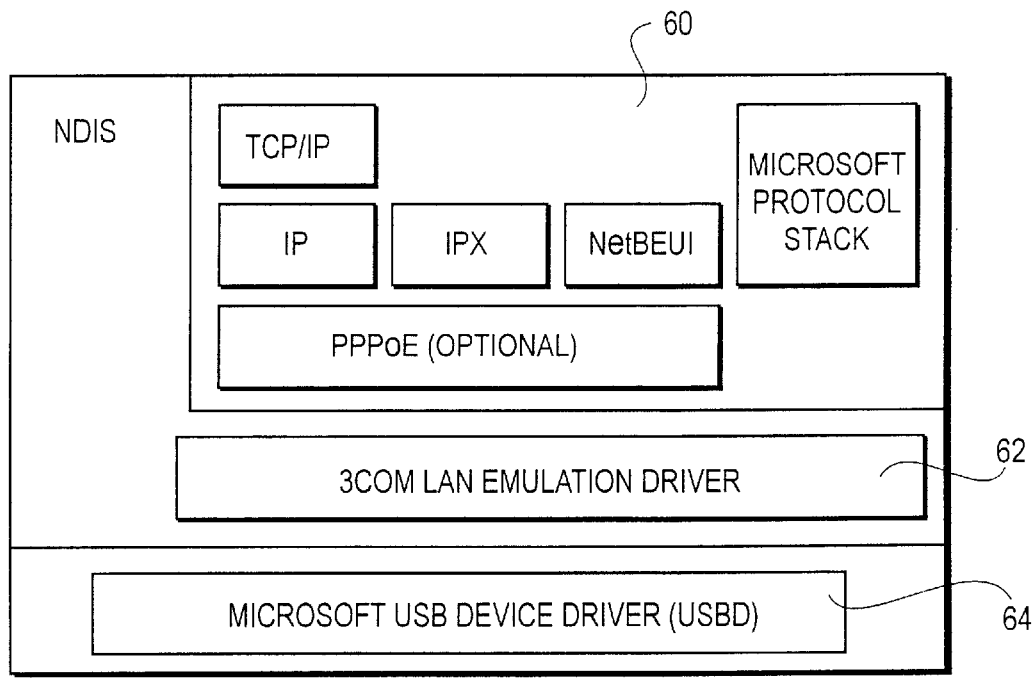
FIG. 4 is a diagram of the software protocol stacks in the USB personal computer of FIG. 1.

Referring now to FIG. 4, the software protocol stacks in the USB-connected computer 12 of FIG. 1 are shown. The computer includes a protocol stack that is part of or runs on the Microsoft Corporation Windows™ operating system (including TCP/IP, IP, Netbeui, and PPPoE processes). The LAN emulation driver 62 sits below the PPPoE and higher network protocol stacks. The USB device driver 64 is also provided with the operating system and sits at the lower layer in the protocol model of FIG. 4.

Figure 5:
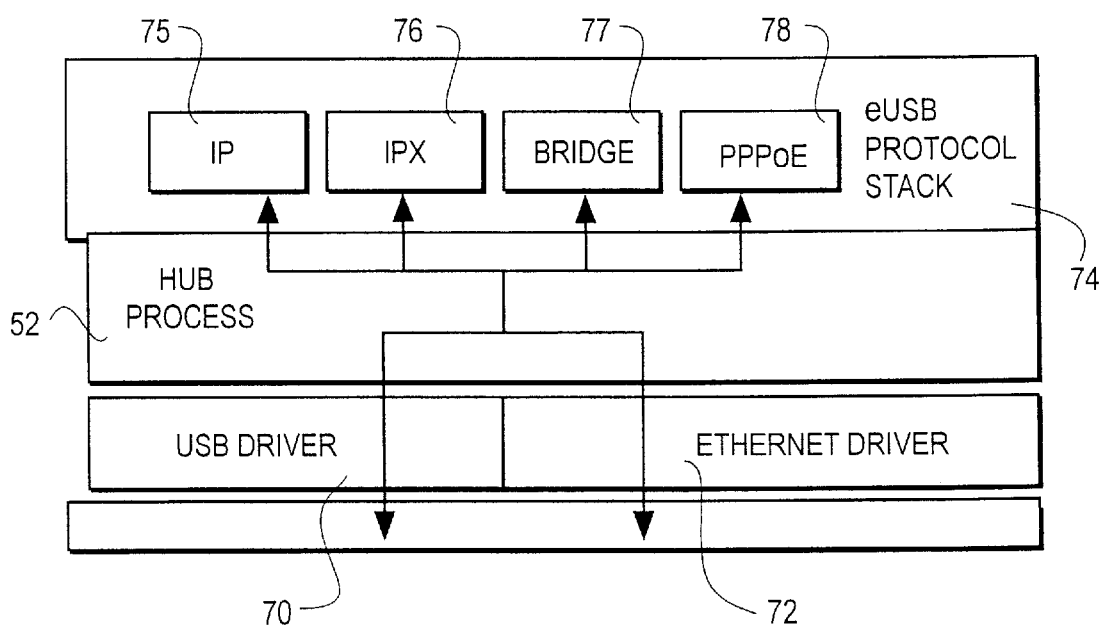
FIG. 5 is a block diagram of the software and protocol stacks in the eUSB modem of FIGS. 1 and 2.

FIG. 5 is a block diagram of the software and protocol stacks in the eUSB modem 16. The USB driver 70 and Ethernet driver 72 sit at the lower layer, and pass datagrams up to the software hub process 52. The hub process 52 either directs the packets received from the USB or Ethernet driver out the peer interface (depending on the destination address in the Ethernet MAC header) or passes the packet up to one of several network level protocol processes in the network protocol stack 74. Source code implementing the hub process of FIG. 5 is attached as an Appendix to this document. These network protocol processes include, in the illustrated embodiment, a IP process 75, a IPX process 76, a Bridge process 77, and a PPPoE process (described in further detail below). The code and functions of the IP, IPX and bridge processes are well known in the art.

Figure 6:
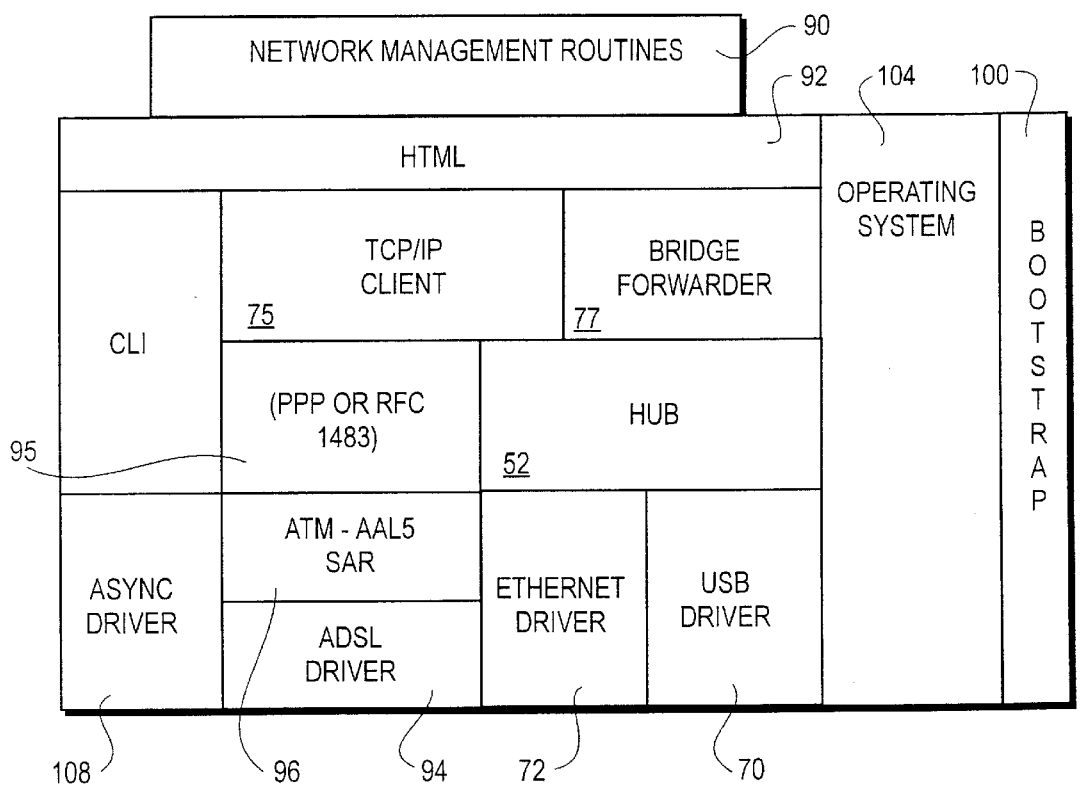
FIG. 6 is a block diagram of the network level software in the eUSB modem of FIGS. 1 and 2.

FIG. 6 is a more detailed diagram of the software processes 74 implemented in the eUSB modem. At the top-most level is a set of network management routines (described below) based on a HyperText Mark-up Language (HTML)-based management application 92. The software further includes known PPP or PPPoE (RFC-1483) processes. Lower level drivers include the USB driver 70, the Ethernet driver 72, and ADSL-related processes including an ADSL driver 94 and an ATM-AAL5 segmentation and re-assembly (SAR) module 96. On the right hand side, there is bootstrap code 100 and operating system code 104. On the left hand side, there is a Command Line Interface (CLI) module 105 which processes management commands that are received over the asynchronous driver 108 (which handles the transmission and reception of RS-232 serial characters which is well known in the art).

The eUSB modem is sold or furnished to the customer with an installation disk. The installation disk contains a set of computer-readable instructions for loading into the USB-connected device, which will typically be a general-purpose computer. The set of instructions implements the LAN emulation driver 62 described herein in the USB-connected device. Basically, the LAN emulation driver takes Ethernet packets from a networking process in the USB-connected device and re-directs the Ethernet packets out the device's USB port as one or more USB cells.

In order to support the emulation of an Ethernet device to the computer, the hardware portion of the hub feature in the ADSL modem (which contains the Ethernet and USB interfaces) will contain two legal MAC addresses stored in an EEPROM memory. One of these MAC addresses will be used by hub feature of the ADSL modem when it transmits and receives packets over the Ethernet port. The other MAC address is provided to the LAN emulation driver that is installed on the USB-connected computer.

Figure 19:
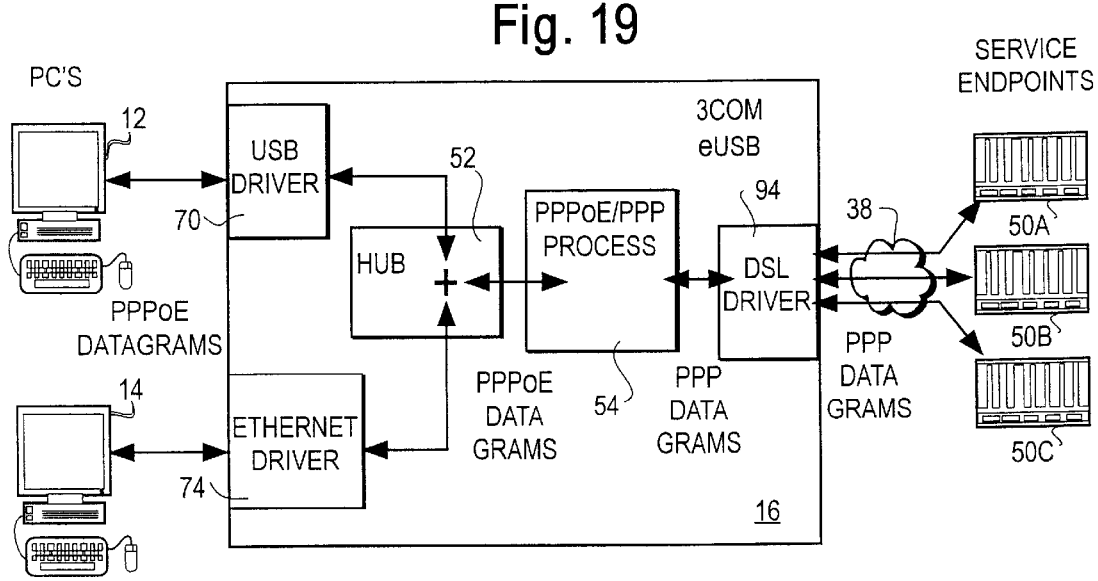
FIG. 19 is an illustration of the connectivity between two computers 12 and 14 and the eUSB modem to multiple remote service endpoints.

B. PPPoE Proxy Service, Route Selection and Transparent Protocol Conversion for Service Endpoints in Data Networks Referring now to FIG. 19, a feature provided by the eUSB modem 16 is that it provides a proxy for service endpoints advertisements, such as the advertisement messages provided for in RFC 2516 (PPPoE), within a data network when the terminating equipment located at those service endpoints do not support such service. It also provides for route selection and transparent protocol conversion of network protocols so that host computers 12 and 14 can communicate with service endpoints when the equipment located at those service endpoints do not support the host computer's network protocol. For example, the illustrated embodiment converts PPPoE protocol packets to the PPP protocol, which would be supported by the remote service endpoints 50A–50C.

The eUSB modem 16 thus provides a proxy service for non-PPPoE supported service endpoint equipment, such as the remote access servers 50A–50C. This is a significant advantage, in that the PPP protocol has been in the market for a long time and most service endpoint equipment supports this protocol. PPPoE, on the other hand, is a very new protocol and is not widely implemented as of yet. Therefore, at the present time there is a huge embedded base of product that supports PPP, but not PPPoE. The eUSB modem 16 bridges the gap between the existing infrastructure and new technology being deployed.

In the illustrated embodiment, the USB-connected computer 12 and/or the Ethernet-connected computer 14 transmits and receives PPPoE packets over their respective interface. These packets terminate in the eUSB modem 16. The PPPoE/PPP process 54 performs the advertising of the service provided by RFC 2516, the route selection, and the transparent protocol conversion. Depending upon the action, the PPPoE/PPP process 54 will either respond to the computer 12 or 14 that initiated the PPPoE packet or will convert and forward the translated packet (now a PPP packet) out the wide area port (in this case the DSL port) to the equipment located at or towards the service endpoint.

The equipment located at or towards the service endpoint transmits and receives PPP packets over the wide area interface 94 in the eUSB modem. The PPP packets from the remote service endpoint are logically terminated in the eUSB modem at the PPPoE/PPP process 54. The PPPoE/PPP process 54 performs route selection and transparent protocol conversion where it will convert and forward the translated packet (now a PPPoE packet) out the appropriate local port (Ethernet or USB) to the appropriate host computer 12 or 14.

There are four steps involved in the typical application of this invention.

(1) In this example, the user (sitting at the host computer 12 or 14) will send a query message seeking for all available service endpoints (where the invention performs proxy service for the PPP service endpoints which do not have native support for PPPoE).

(2) The logical connection to the service endpoint is initiated. The eUSB modem performs route selection and transparent protocol conversion for the remote service endpoint.

(3) Data packets are passed between the host computer and service endpoint. Transparent protocol conversion between PPP and PPPoE is performed for the packets passing between the eUSB modem and the remote service endpoint.

(4) The logical connection to the service endpoint is terminated. The eUSB modem performs a proxy service for the PPP endpoints in the termination of the logical connection.

Step 1: Finding Out Which Services are Available

Figure 12:
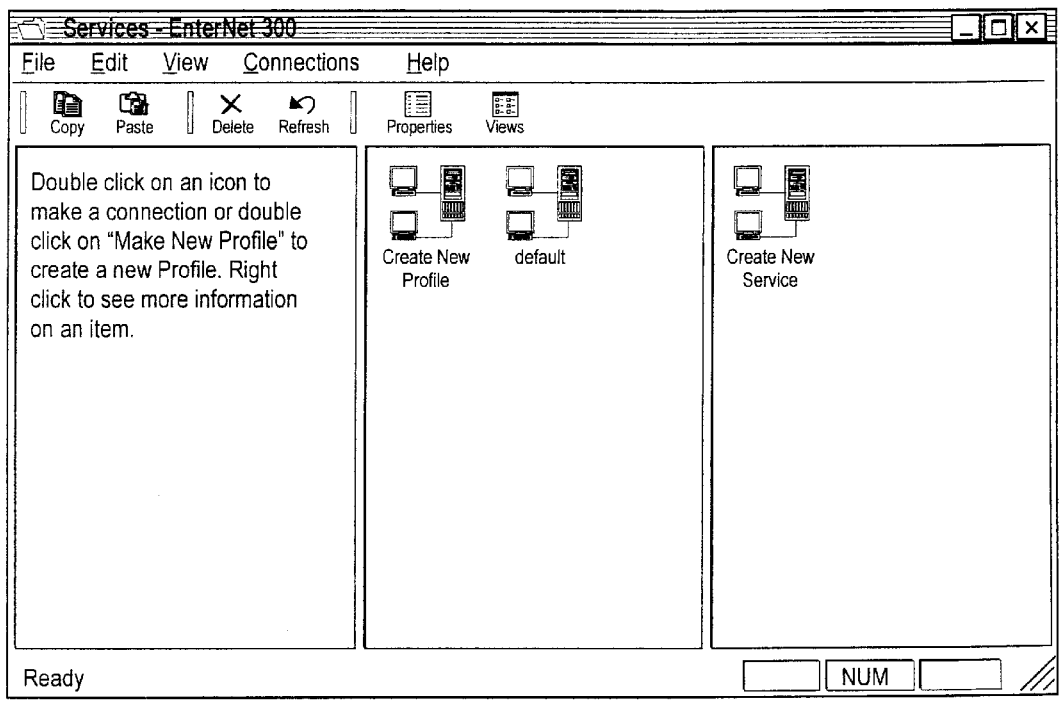
FIG. 12 is an illustration of the screen display on one of the computers of FIG. 1, before the computer queries for a service endpoint in accordance with the PPPoE protocol.
Figure 13:
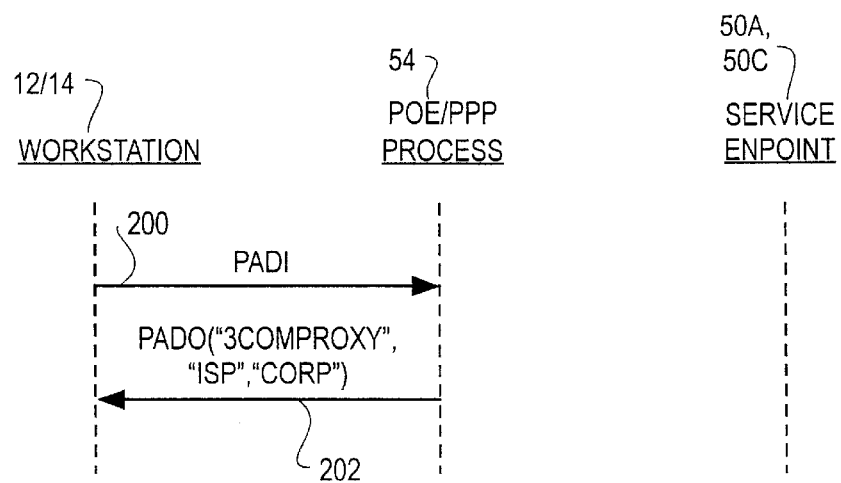
FIG. 13 is an illustration of the message exchanges between the computers 12 or 14 of FIG. 11 that initiates the service endpoint inquiry, showing the service endpoint inquiry being terminated in the PPPoE terminator software process or module in the eUSB modem (rather than by the remote service endpoint).
Figure 14:
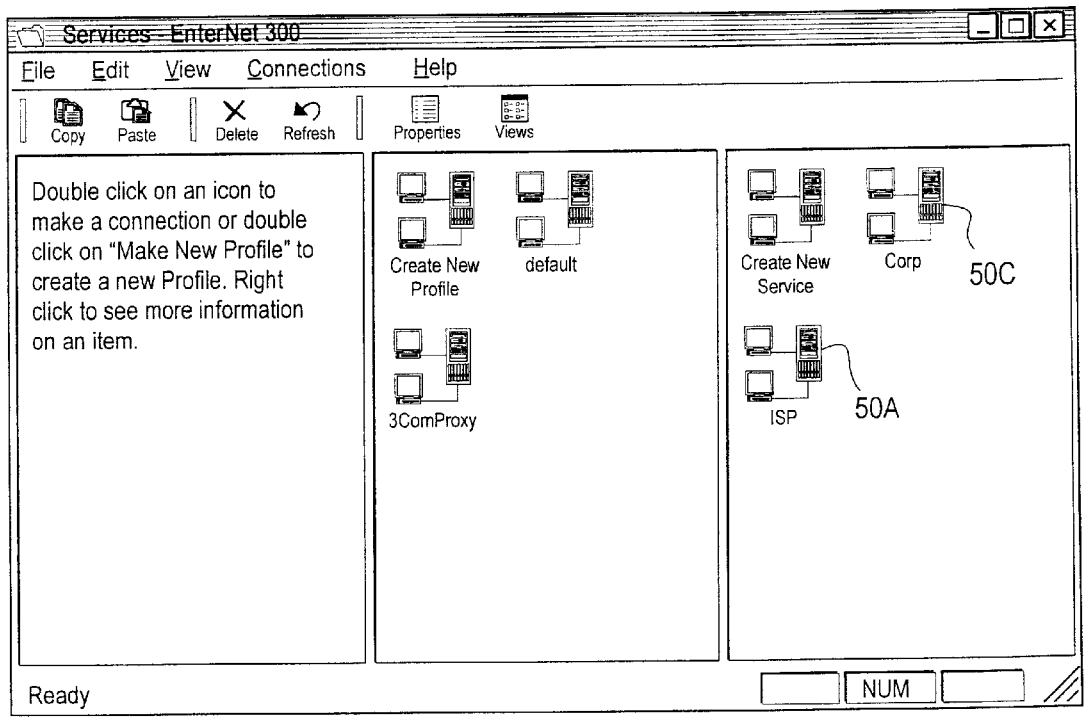
FIG. 14 is an illustration of the screen display at the computer 12 or 14 after it has queried for the service endpoints.

The user must first initiate the PPPoE application on the host computer. FIG. 12 illustrates a sample screen snapshot before the service query has occurred. Once the application has loaded, the application will automatically send (or the user will initiate) a query for all available services. FIG. 13 shows the host computer sending out the service endpoints query message (PADI) as defined in RFC 2516. In response to the PADI, all service endpoints that support the PPPoE protocol will respond with a list of service endpoints that can be reached from their equipment. In addition, the PPPoE/PPP proxy 54 will also respond with a PADO message (as defined in RFC 2516) that indicates all service endpoints that can be reached (via PPP) by terminating in the unit that contains this invention, i.e., eUSB modem 16. Notice that in our example, the PPP service endpoints "ISP" and "CORP" can be reached by attaching to the PPPoE/PPP process 54 which implements this invention, which we called "3Com-Proxy". Finally, FIG. 14 shows the updated screen snapshot after the PPPoE application has received the PADO message back from "3ComProxy".

Step 2. Initiating a Connection to a Service Endpoint

Figure 15:
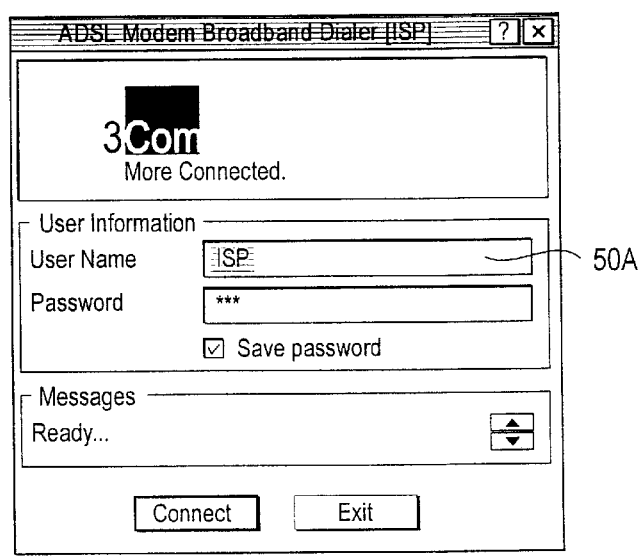
FIG. 15 is an illustration of the screen display of the computer 12 or 14 as it initiates a connection with the remote service endpoint.
Figure 20:
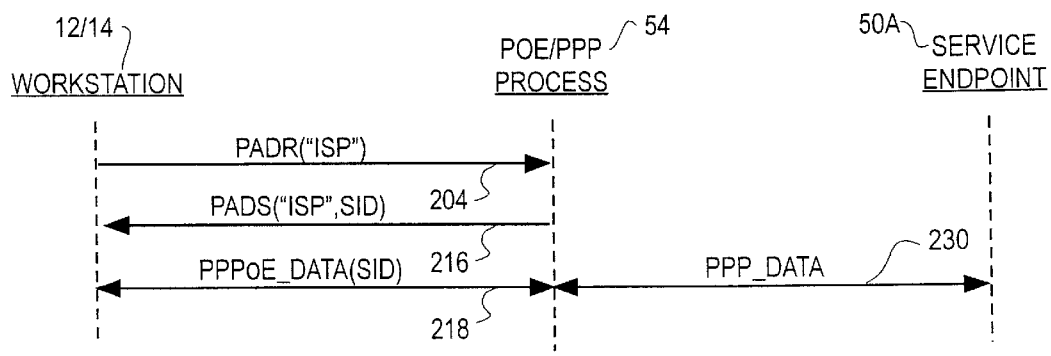
FIG. 20 is an illustration of the message flow for the proxy service for PPPoE connection establishment, and the transparent conversion between PPPoE and PPP packets, performed by the PPPoE/PPP proxy engine in the eUSB modem of FIG. 1.

Now the user needs to initiate a connection to a specific service endpoint before data passing can occur. FIG. 15 illustrates a connection screen for the service endpoint "ISP". FIG. 20 shows the host computer sending out the service endpoints connect request message (PADR) as defined in RFC 2516. In response, the PPPoE/PPP process 54 will select and save the route that the data packets associated with this connection will take and responds with a connect acknowledge message (PADS) 216. At this point, the logical connection is established.

Step 3: Passing Data Between the Host Computer and the Service Endpoint

Again referring to FIG. 20, the host computer will send PPPoE datagrams to the PPPoE/PPP process, indicated at 218. The PPPoE/PPP process 54 transparently converts the PPPoE packets to PPP packets by stripping the PPPoE/MAC header from the Ethernet packet and forwards it out the appropriate interface as dictated by the route selection in step 2. In the present example, the appropriate interface is the DSL interface, as opposed to the local Ethernet interface. This is illustrated by the PPP_DATA 230 in FIG. 20. From the other direction, the Service Endpoint equipment will send PPP datagrams to the PPPoE/PPP process 54. The PPPoE/PPP process 54 transparently converts the PPP packets to the PPPoE packets by prepending the PPPoE and Ethernet MAC header to the received PPP packet and then forwarding it out the appropriate interface to which the host computer 12 or 14 is attached, namely the USB interface or the Ethernet interface.

Step 4: Terminating a Connection to a Service Endpoint

To terminate the active session to "ISP", the user needs to initiate the termination of the connection from the PPPoE application residing on the host computer. A suitable termination screen appears on the user's computer and they click an icon to terminate the connection with the remote service endpoint. FIG. 21 shows the host computer sending out the service endpoints terminate request message 232 (PADT) as defined in RFC 2516. In response, the PPPoE/PPP process sends out a PPP termination request message 234 (PPP_Term) to the PPP service endpoint and releases the resources associated with the logical connection. The PPP service endpoint can optionally send a PPP termination acknowledge message 236 (PPP_Term_ACK). At this point, the logical connection is terminated.

II. eUSB ADSL Modem/Hub 16 Detailed Hardware Design

Figure 8:
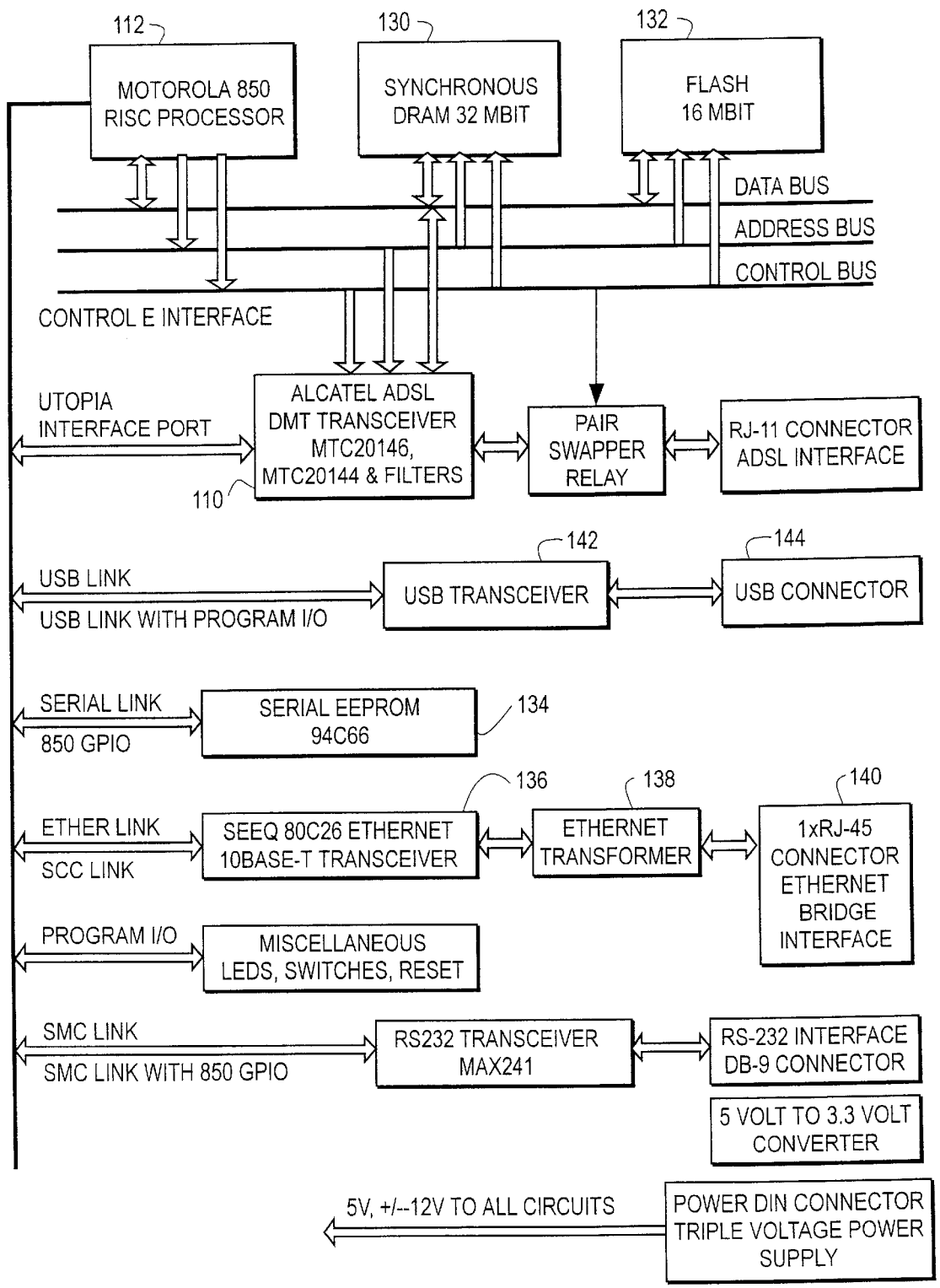
FIG. 8 is a hardware block diagram of the eUSB modem of FIGS. 1 and 2.

Referring now to FIG. 8, the hardware design of the eUSB ADSL modem/hub 16 will now be described.

RISC Processor 112

The eUSB modem incorporates a Motorola MPC850SAR segmentation and re-assembly RISC processor running at 50 MHz. The MPC850SAR has been specifically designed for embedded applications and uses a PowerPC core with various peripheral functions integrated into the 850SAR package. The primary tasks of the MPC850SAR are packet forwarding, protocol encapsulation, and ATM layer processing.

Features of the MPC850SAR processor are:
1. Extensive embedded datalink peripherals
    10 Mb Ethernet controller
    ATM SAR controller, accessed through standard ATM UTOPIA bus
    Synchronous (HDLC) controller
    Asynchronous (UART) controller, for user interface/debug port
    USB interface through an serial communications controller (SCC)
2. Glueless interfaces to DRAM, FLASH, and peripherals
    32 bit data bus
    Intergrated SDRAM controller
    Support for multiple memory timing parameters The reader is directed to the MPC850SAR User's Manual for further details.

DRAM 130

DRAM 130 is accessed exclusively by the 850SAR for code execution, through a DRAM controller embedded within the 850SAR. The DRAM array is 1M×32, implemented with two 1M×16 Synchronous DRAM (SDRAM). The SDRAM footprints on the board will accept 4M×16 DRAMs, for future versions of the product that may require a 4M×32 memory array.

FLASH Memory 132

FLASH memory 132 on the eUSB modem is used for (a) execution of boot code, (b) storage of 850SAR operational code, (c) storage of configuration information, and (d) storage of DMT modem code for the Alcatel chipset, downloaded by the 850SAR to the chipset during training of the modem. The majority of FLASH is dedicated to storage of the operational code, which is downloaded at start-up to DRAM for faster execution. One chip site is present for FLASH and may be populated with either a 16 Mbit (1M×16) or 32 Mbit (2M×16) device. The devices used are sectored parts that also contain a boot block sector. Each sector may be erased individually without affecting the other sectors.

Serial EEPROM 134

The eUSB includes 512 bytes of non-volatile storage in a serial EEPROM 134 accessible to the MPC850SAR 112. Information relating to the production of the product is stored there, such as:
    Product Code
    Hardware Rev
    Serial Number
    Ethernet MAC Addresses—two are required. One is used for handling of traffic destined for the USB-connected computer 12. The other is for traffic destined for the Ethernet-connected computer 14.

Ethernet Interface 136

The Ethernet physical layer functions of transmission, reception, clock recovery, signal timing and 10 Base-T link monitoring are implemented by the Seeq 80C26 Ethernet PHY transceiver, in conjunction with a coupling transformer 138 between the PHY and an RJ-45 connector 140. The 4-wire interface (2 for transmit, 2 for receive) between the transformer output and the RJ-45 pins is routed through the MDI/X switch, allowing the user to connect the interface to either a standard hub port or to the expansion port on a hub.

Ethernet packet processing is performed by the 850SAR 112. One of the 850SAR's Serial Communications Controllers (SCC) is dedicated to this task.

USB Interface 142, 144

The USB interface consists of a USB connector 144 and a USB transceiver 142. All USB protocol processing will be performed by the 850SAR 112, through a dedicated SCC in the 850SAR. The 850SAR may implement up to four possible USB endpoints; the eUSB will require three USB endpoints. Endpoint 0 is a required control endpoint for all USB devices and will only used for normal control commands and responses as defined in the USB Specification. This allows the Endpoint 0 to run in interrupt mode to ensure that normal USB commands receive prompt attention. Endpoint 1 will only be used for transmitting and receiving data to/from the ADSL line. In order that the data be sent over the correct ATM VPI/VCI, a 4 byte header will be prepended to all data packets. Endpoint 2 commands are used to set configuration or to retrieve device information.

DMT Modem 110

The DMT modem in eUSB is implemented with the Alcatel Microelectonics (AME) MTK20140 chipset 110.

The chipset is a complete solution designed for conformance to Issue 2 of the ANSI T1.413 ADSL standard. T1.413 defines two categories of modem, Category1 (FDM) and Category2 (echo canceled). The MTK20140 implements Category 1, where the upstream and downstream paths are separated by non-overlapping frequency bands, i.e. through Frequency Division Multiplexing (FDM). The chipset consists of two devices, the MTC-20146 DMT Processor and the MTC-20144 DMT Coder/Decoder (Codec).

All DMT functions are performed by the Alcatel MTC-20146. The device consists of a controller block and a DMT transceiver block. The controller portion of MTC-20146 contains an embedded ARM processor, with ROM, RAM and peripherals. The controller is responsible for initialization of the transceiver, control of the training sequence and line monitoring once the link is established. The controller is downloaded and commanded by the 850SAR through the CTRLE interface. CTRLE is accessed as a block of memory locations by the 850SAR. The data path between the 850SAR and the MTC-20146 is through a UTOPIA bus interface. ATM cells flow through this path.

The primary component in the eUSB's Analog Front End is the MTC-20144. The codec integrates a 13-bit ADC (Analog-to-Digital Converter) for downstream sampling and a 12-bit DAC (Digital-to-Analog Converter) for upstream sample conversion. Both converters operate at 8.832 MHz sample rates. The digital path to/from the MTC-20146 is through two nibble-wide buses that run at 4 times the sampling rates. The codec's analog side includes two LPFs (Low Pass Filters) between the line side and the converters; the downstream LPF cutoff frequency is 1.1 MHz and upstream is 138 kHz. The codec performs bit timing recovery from the downstream DMT symbol stream by monitoring the pilot tone (bin 64) and issuing correction voltages to an external VCXO, using an additional internal DAC to produce the control voltage.

The codec's line side connects to a set of external filters which frequency division multiplex (FDM) the downstream and upstream channels. The FDM filters consist of a low pass filter for the upstream path and a high pass filter for the downstream direction. A line driver and receive buffer amplifier follow the FDM filters and to drive and receive signal from the hybrid transformer circuit. The hybrid is required to combine the two signal paths onto a single twisted wire pair.

Protection circuitry consists of overvoltage and overcurrent elements, capable of permitting the device to pass UL1950 and FCC Part 68 surge tests.

III. USB Driver to Miniport Interface

This section of this document contains further information regarding the LAN Emulation driver 62 shown in FIG. 2.

USB Overview

Universal Serial Bus is a data transmission medium that was developed for universal connectivity of communications devices. The specification for this interface was developed by a consortium of manufacturers, known as the Universal Serial Bus (USB) Specification, Revision 1.0, by Compaq, Digital Equipment, Corporation, IBM, Intel, Motorola, NEC, and Northern Telecom, dated Jan. 15, 1996, is currently available on the Internet at http://usb.org.

USB Transfer Types

USB offers two methods for data transmission, bulk data and isochronous data. Isochronous data does not guarantee delivery but allows bandwidth to be reserved. All but 10% of the bus bandwidth may be reserved by isochronous devices. The remaining 10% cannot be reserved to allow sufficient bandwidth for transmission of control packets. Isochronous devices are limited to the amount of bandwidth which they reserve and they may release any bandwidth not needed for a given frame. If insufficient unreserved bandwidth exists when an isochronous device is first configured, the new device will not be allocated any bandwidth.

Bulk data offers guaranteed delivery but offers no method of reserving bus bandwidth, however bulk devices are free to use all unused bandwidth which includes all bandwidth which is not reserved plus any which is released by isochronous devices plus any unused portion of the 10% reserved for control packets. On a fully subscribed USB bus, a bulk device will be able to use all unused bandwidth with the possible danger that there may be no spare bandwidth during a given frame. On the other hand a new isochronous device on a fully subscribed USB bus would be excluded during the configuration stage and would not be able to use any bandwidth whatsoever.

Interrupt data is obtained periodically by the host (i.e., the USB host controller within the USB-connected computer 12) according to a pre-defined polling interval. The chief differences between bulk and interrupt data is that only one interrupt packet is allowed per USB frame (1 msec). When the host attempts to read interrupt data via an IN and times out on the transaction, no further retries are possible until the next polling interval.

Isochronous devices are typically unidirectional and have very simple data streams. Examples of isochronous devices include video cameras and audio speakers. It is fairly easy to take a single data stream (such as a video or audio feed) and deliver it as isochronous data across USB. An ADSL modem does not lend itself to the isochronous model of USB data delivery. It is not unidirectional to begin with. It is also not a simple data stream, instead consisting of multiple virtual circuits carrying user data as well as control data. A USB microcontroller powerful enough to handle bidirectional isochronous complex data streams would undoubtedly be expensive enough to drive the product cost up considerably, if such a powerful USB microcontroller existed. For these reasons, the preferred embodiment of the invention utilizes the bulk data method of transferring network protocol/application data over the USB bus.

USB Endpoint Configurations

The MPC-850 has 4 possible USB endpoints available. This device will use 3 of those 4 endpoints. The following section describes the configuration of the 3 endpoints.

Endpoint 0 is a required control endpoint for all USB devices. Other endpoints are assigned various device specific functions as shown in the table below.

TABLE 1

Endpoint assignment

| Endpoint | Function |
| --- | --- |
| 0 | Required control endpoint |
| 1 | Bulk data information |
| 2 | Bulk endpoint used for sending configuration, downloading code updates, and retrieving statistics |

Endpoint 0 Commands and Responses

Endpoint 0 will be only used for normal control commands and responses as defined in the USB specification. This allows the endpoint to run in interrupt mode to ensure that normal USB commands receive prompt attention.

Endpoint 1 Commands and Responses

Endpoint 1 will be only be used for transmitting and receiving data to/from the ADSL line. In order that the data be sent over the correct ATM VPI/VCI and insure data integrity, a 4 byte header will be prepended to all data packets. This is referred to herein as the proprietary or 3Com USB packet header and detailed in the table below.

The host will always keep an outstanding read transaction of the maximum Ethernet packet plus 3Com packet header size pending so that the device has a way of delivering data as soon as it arrives. The device will deliver a single Ethernet packet per read transaction. Upon receiving an Ethernet packet from the device, the host driver will reissue a read transaction for the maximum Ethernet packet plus 3Com USB packet header size to allow the timely delivery of any additional Ethernet packets which the device may have collected from the ADSL line.

If the device has no data to deliver for approximately 1 second, it will send a single zero byte to terminate the outstanding transaction. The host driver will discard this null packet and reissue the read transaction. This will prevent the driver from dealing with unexpected timeouts which will occur on outstanding transactions.

| Offset | Function |
| --- | --- |
| 0x00 | 0xbf (fixed value which indicates Beginning of Frame) |
| 0x01 | Logical VC number. Corresponds to logical VC number used in EP2_H2D_VC_CONFIG and EP2_H2D_VC_DEACTIVATE commands. |
| 0x02 | Frame length of data only (MSB) |
| 0x03 | Frame length of data only (LSB) |

Endpoint 2 Commands and Responses

Endpoint 2 commands are used to set configuration or to retrieve device information. The table below lists the Endpoint 2 commands supported by the USB driver on the device.

The host will always keep an outstanding read transaction of the maximum Endpoint 2 response size pending so that the device has a way of delivering data as soon as it arrives. The device will deliver a single response per read transaction. Upon receiving a response from the device, the host driver will reissue a read transaction for the maximum response size to allow the timely delivery of any additional responses which the device may need to deliver.

If the device has no responses to deliver for approximately 1 second, it will send a single zero byte to terminate the outstanding transaction. The host driver will discard this null response and reissue the read transaction. This will prevent the driver from dealing with unexpected timeouts which will occur on outstanding transactions.

| Brequest value | Command | Description |
| --- | --- | --- |
| 0xf0 | Unused | Unused |
| 0xf1 | Unused | Unused |
| 0xf2 | EP2_H2D_GET_EEPROM | Causes device to retrieve EEPROM data which includes MAC address and Board Serial Number. |
| 0xf3 | EP2_D2H_EEPROM_DATA | EEPROM data from previous EP2_H2D_GET_EEPROM request. |
| 0xf4 | EP2_H2D_SET_EEPROM | Causes device to update selected offsets in EEPROM. |
| 0xf5 | EP2_H2D_SET_MODE | Used to inform device whether LAN or WAN driver is running on host. |
| 0xf6 | Unused | Unused. |
| 0xf7 | Unused | Unused. |
| 0xf8 | Unused | Unused. |
| 0xf9 | Unused | Unused |
| 0xfa | Unused | Unused |
| 0xfb | Unused | Unused |
| 0xfc | Unused | Unused |
| 0xfd | Unused | Unused |
| 0xfe | Unused | Unused |

EP2_H2D_GET_EEPROM

The Get EEPROM command is used to retrieve the contents of EEPROM (MAC address, board serial number, etc.).

| Byte offset | Description |
| --- | --- |
| 0x00 | Command Flag = 0xbc |
| 0x01 | Command Type = 0xf2 (EP2_H2D_GET_EEPROM) |
| 0x02–0x03 | Command Length = 0x0004 |

EP2_D2H_EEPROM_DATA

The EEPROM Data response is used to return the contents of EEPROM (MAC address, board serial number, etc.).

| Byte offset | Description |
| --- | --- |
| 0x00 | Command Flag = 0xbc |
| 0x01 | Command Type = 0xf3 (EP2_D2H_EEPROM_DATA) |
| 0x02–0x03 | Command Length = TBD |
| 0x04–TBD | MAC Address, Board Serial number, etc. |

EP2_H2D_SET_EEPROM

The Set EEPROM command is used to alter the contents of EEPROM (MAC address, board serial number, etc.). It is expected that this command would only be used by factory diagnostics.

| Byte offset | Description |
| --- | --- |
| 0x00 | Command Flag = 0xbc |
| 0x01 | Command Type = 0xf4 (EP2_H2D_SET_EEPROM) |
| 0x02–0x03 | Command Length = nnnn |
| 0x04–TBD | MAC Address, Board Serial number, etc. |

EP2_H2D_SET_MODE

The Set EEPROM command is used to inform the device of what type of host driver is running (LAN or WAN). The driver will behave differently based on what type it is. A LAN driver does not have to configure VCs and may start sending data immediately after issuing this command.

| Byte offset | Description |
| --- | --- |
| 0x00 | Command Flag = 0xbc |
| 0x01 | Command Type = 0xf5 (EP2_H2D_SET_MODE) |
| 0x02–0x03 | Command Length = 0x0005 |
| 0x04 | 0 = LAN, 1 = WAN |

Initialization Between LAN Emulation Driver 62 and Hub 16

Initialization of communications between the LAN-Emulation Driver 62 and the Hub 16 requires multiple steps, which are as follows:

1) eUSB ADSL Modem Enumeration

Before any device can communicate any payload (network protocol or application) data over the USB, it must first register with the USB Host Controller, which is the master in the USB system. Enumeration is a well-defined procedure in the USB Specification. This process will be initiated upon any of the following three occurrences:

1) The USB-connected device, which contains the LAN-emulation driver and the USB Host Controller hardware, has just been powered on.

2) The eUSB ADSL Modem which contains the hub has just been powered on.

3) The USB cable between the two devices has just been connected.

2) Initial Handshake Messaging Between the LAN-Emulation Driver and the USB Device Driver Once enumeration has completed, the LAN-Emulation Driver 62 sends an Endpoint 2 command to the eUSB requesting the MAC address that the LAN-Emulation Driver is supposed to pass up to the operating system. This command is described above ("Request MAC Address"). Upon reception of the request, the USB device driver contained within the eUSB ADSL Modem 16 will obtain the MAC address from the unit's EEPROM (See FIG. 8) and returns that information to the LAN-Emulation Driver in the form of an Endpoint 2 response. This response is described above ("Return MAC Address"). Upon reception, the LAN-Emulation driver saves this information and supplies it to the operating system or networking applications running on the USB-Connected device (upon request).

Initialization between the LAN-Emulation driver and the eUSB ADSL Modem is now complete and data can flow freely between the LAN-Emulation driver and the hub.

IV. Data Flow

Figure 7:
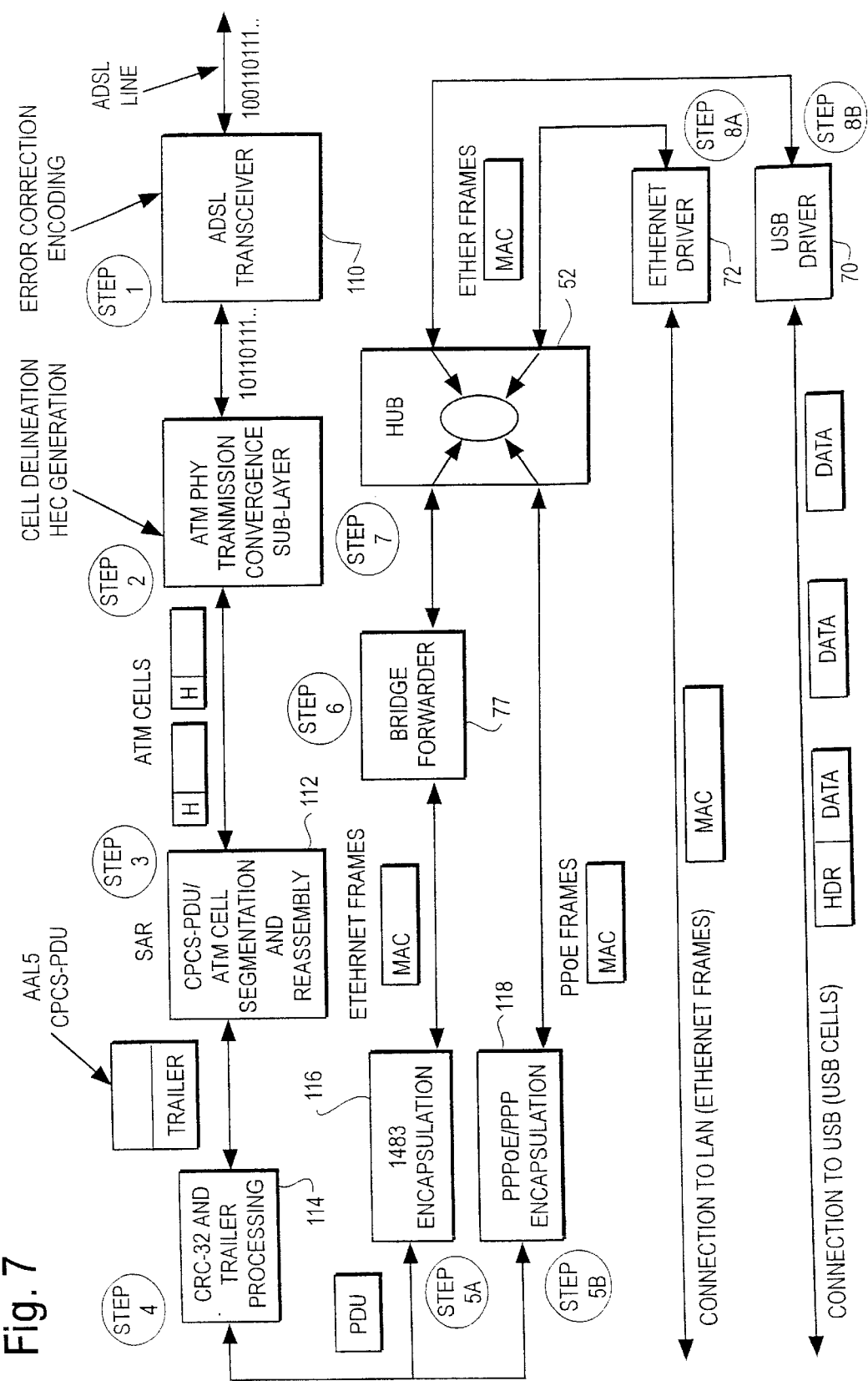
FIG. 7 is a detailed flow diagram showing the flow of data through the eUSB modem between the ADSL port, the Ethernet port and the USB port.

FIG. 7 is a diagram showing the data flow between the USB driver, the Ethernet driver, and the ADSL line. The reader is directed to FIG. 7 and FIG. 8 in the following discussion. The hardware diagram of FIG. 8 is discussed earlier in this document.

Step 1

Data in analog form received from the ADSL line 20 (FIG. 1) is digitized and demodulated into a digital bitstream by an Alcatel ADSL transceiver chipset 110, shown in FIG. 8 and described elsewhere. The resultant data is a continuous stream of ATM cells.

Step 2

The ATM physical layer circuitry ATM PHY, located within the Alcatel chipset, performs ATM Transmission Convergence (TC) sub-layer functions of cell delineation and Header Error Control (HEC) verification on the cell stream that results from Step 1. All cells with failing HEC are dropped by the ATM PHY; those which pass the HEC check are forwarded to a Motorola model 850 ATM Segmentation And Re-assembly (SAR) reduced instruction set processor 112, across a UTOPIA bus between the a Motorola model 850SAR processor and the Alcatel chipset.

Step 3

The Motorola 850SAR processor 112 is responsible for segmenting ATM Adaptation Layer 5 (AAL5) Common Part Convergence Sublayer-Protocol Data Units (CPCS-PDU's) into ATM cells in the upstream direction, and reassembling ATM cells into AAL5 CPCS-PDU's in the downstream direction. The SAR processor is also where traffic shaping in the upstream direction is performed. In the downstream direction, the ATM SAR assembles the inbound ATM cells into an AAL5 CPCS-PDU. As ATM cells are being reassembled into the AAL5 CPCS-PDU, the cell headers are stripped off and the payload is appended to AAL5 CPCS-PDU. The AAL5 CPCS-PDU is completed when the Payload Type (PT) field of the ATM cell header contains a non-zero value. In the upstream direction, the ATM SAR will segment CPCS-PDU's into ATM cells. This requires setting the proper ATM header fields (including the PT field in the case of the last cell). The ATM SAR will perform traffic shaping by placing the cell into the appropriate outgoing bin (based on Peak Cell Rate) and transmitting from the bin at the calculated rate.

Step 4

A 32 bit CRC and trailer processing module 114 processes the AAL5 CPSC-PDU's. In the upstream direction, a CRC must be calculated for the entire ATM PDU. This CRC is placed in a trailer that is added to the end of the PDU. Because the entire length of an AAL5-PDU must 45 be evenly divisible by 48 and end with the 2 word trailer, pad bytes may be required between the end of the PDU and the beginning of the trailer. In the upstream direction, this module 114 is responsible for adding the padding as well as the trailer. In the downstream direction, a check for a valid CRC must first be conducted. The CRC is calculated and compared with the CRC value stored in the trailer of the received PDU. The PDU is dropped if there is no match; otherwise, the trailer and any padding is removed prior to sending the PDU forward.

Step 5a

The PDU's are forwarded to one of two encapsulation modules 116 and 118, depending on the network protocol associated with the PDU. RFC-1483 specifies two methods for carrying bridged Protocol Data Units (PDUs) over an ATM network. They are LLC Encapsulation and VC Based Multiplexing. The LLC Encapsulation method is used when more than one protocol is carried over the same Virtual Connection (VC). In VC Based Multiplexing, each VC carries only one protocol and therefore does not require the LLC/SNAP Encapsulation to determine which protocol is being carried. VC Based Multiplexing is supported in the illustrated embodiment. In simplistic terms, the task at this step or module 116 is to perform the RFC-1483 encapsulation in the upstream direction and remove the RFC-1483 encapsulation in the downstream direction.

Step 5b

PPP protocol is also supported in the illustrated embodiment. The PPPoE process or module 118 performs two duties. The first is encapsulation/decapsultion. Specifically, the PPPoE header will be stripped off the packets in the upstream direction (leaving only PPP packets). The module 118 performs PPPoE encapsulation in the downstream direction (prepend to the PPP packets). Since the PPPoE protocol is connection oriented, the PPPoE process also keeps the connection and routing information. Therefore, the second duty is to forward the packet appropriately.

Step 6

This step is only performed for transparently bridged RFC-1483 connections/packets. A bridge/forwarder process 77 (see also FIGS. 5 and 6) determines the destination of Ethernet packets by performing a lookup in it's forwarding database for the destination MAC address. The lookup should result in the packet being forwarded to either the WAN or LAN interface. Each PVC supported over the ADSL interface will look like a separate WAN interface to the bridge.

Step 7

For upstream packets (i.e., packets received from the Ethernet and/or USB drivers) the hub process 52 is responsible for determining whether packets get sent up the protocol stack (FIG. 5) or out the peer local interface (or both in the case of broadcast packets). For downstream packets (i.e., packets arriving from the bridge 77 or the PPPoE/PPP module 118), the Hub process 52 is responsible for determining which local interface the packet gets forwarded (or both in the case of broadcast packets). The hub functions as a "mini-bridge". The main benefit of this process 52 is that it presents a single interface to the network processes (processes 75, 76, 77, 78 of FIG. 5) which aids in the routing and forwarding of packets. A further benefit of this task is that it allows the user to control whether or not Ethernet-based computers can communicate with the USB-based computers.

Step 8a

The Ethernet driver 72 is responsible for the transmission and receipt of Ethernet frames from the Ethernet network 22 (FIG. 1). In the illustrated embodiment, an embedded MPC850SAR Ethernet Controller is used. All data packets retain their MAC headers as they are presented to the bridge forwarder 77.

Step 8b

The USB driver 70 is responsible for the transmission and receipt of USB cells. In the illustrated embodiment, the embedded MPC850SAR USB Controller is used. For upstream packets, the USB driver will assemble cells, then strip off the 3Com USB packet header before forwarding them to the Hub Process 52. For downstream packets, the USB driver will prepend the packet with the 3Com USB packet header and then segment the packet into USB cells and forward them out the USB interface for transmission to the USB computer.

V. Other Dual Ethernet/USB ADSL Modem Features

In addition to providing the proxy feature and hub features described at length above, the preferred embodiment of the eUSB modem 16 supports additional features. These features will be described in this section. Broadly speaking, these features are not particularly related to the proxy feature per se. In other words, the proxy aspect of the invention can be implemented either alone or in a modem or other type of device, either with or without the features described in this section. However, by adding these features to the eUSB modem product, further value and functionality is provided to the user.

A. Transparent Support of Dynamic Connections (e.g., Switched Virtual Circuits Over ATM) to Remote Service Endpoints Th eUSB modem 16 provides transparent support for the establishment and tear down of dynamic connections, such as switched virtual circuits over an ATM network. More particularly, the eUSB modem allows the computers connected to either the USB serial port or the Ethernet port of the eUSB modem to establish and tear down dynamic switched virtual circuit connections with service endpoints, such as the remote access concentrators shown in FIG. 1.

The eUSB modem 16 product of the preferred embodiment is believed unique in that it that it provides dynamic connection service for host computers that do not provide native or integral support for such dynamic connections. Previous DSL service deployments are believed to be permanent virtual circuits. For economic reasons, there is a strong desire among the major ADSL service provides, such as the Regional Bell Operating Companies (RBOC's), to move towards switched virtual circuits. The eUSB ADSL modem provides support for legacy host systems that do not provide inherent support for dynamic switched virtual circuit connections.

In the preferred embodiment, the USB-connected computer 12 and/or the Ethernet-connected computer 14 transmits and receives PPPoE packets over their respective interfaces. These packets terminate in the eUSB modem 16. A PPPoE/PPP proxy engine or process 54 (FIG. 2) in the eUSB modem controls the establishment and tear down of the dynamic connections, in this case a switched virtual circuit within an ATM network. Call establishment and tear down are stimulated by the reception of particular PPPoE packets received from the computer 12 or 14 that wishes to set up the connection. The setup and tear down of the sessions occur in a manner completely transparent to the computer. Once a dynamic call is established, the PPPoE packets are forwarded over the newly established logical connection to the service endpoint.

The method, in the preferred embodiment, consists of four steps:

(1) The computer 12 or 14 sends a query message to the eUSB modem 16 asking for all available service endpoints (e.g., remote access servers 50A–C in FIG. 2). In the preferred embodiment, the query message is terminated in the eUSB modem in the PPPoE/PPP proxy engine 54, which performs the proxy service on behalf of the remote service endpoint.

(2) The computer 12 or 14 then initiates a logical connection with the service endpoint. In a preferred embodiment, the eUSB modem takes advantage of information in a PPPoE Active Discovery Request (PADR) message in accordance with RFC 2516 and transparently establishes a dynamic connection with the service endpoint.

(3) Data packets are passed back and forth between the computer and the service endpoint over the newly-established connection.

(4) The computer terminates the logical connection to the service endpoint. In the preferred embodiment, the eUSB 16 takes advantage of the PPPoE Active Discovery Terminate (PADT) message and transparently terminates the connection with the service endpoint.

The four steps above will now be explained in further detail with reference to FIGS. 11 to 18. FIG. 11 shows the connectivity of the eUSB modem 16 to the USB computer 12 and the Ethernet computer 14, prior to initiation of any connections with the remote service endpoints 50A and 50C. In this example, the two remote service endpoints available for PPPoE connections are an ISP remote access concentrator 50A providing access to a packet switched network (e.g., Internet), and a corporate remote access server 50C providing access to a corporate backbone network.

Step 1. Finding Out Which Services are Available

The user at the computer (e.g., the USB-connected computer 12 in FIGS. 1 and 11) must first initiate the PPPoE application on the computer. The method assumes that such an application is installed on the computer. FIG. 12 illustrates a sample screen display after the PPPoE application has been initiated, but before the service query has occurred. Once the application has loaded, the application will either automatically initiate a query for all available services, or else will prompt the user to initiate the query. FIG. 13 shows the computer sending out the service endpoints query message 200. Preferably, this message takes the form of a PPPoE active discovery initiation message (PADI) as defined in RFC 2516. In response to the PADI message, all service endpoints that support the PPPoE protocol will respond with a list of the service endpoints that can be reached from their equipment. In addition, the eUSB modem 16 responds to the computer 12 with a PPPoE Active Discovery Offer message 202 (as defined in RFC 2516) which lists all service endpoints that can be reached by establishing a dynamic (switched) connection towards that service endpoint. This proxy service is described in further detail below.

Notice in the example of FIG. 12, the dynamic service endpoints "ISP" and "CORP" can be reached by attaching to the PPPoE/PPP proxy engine 54 in the eUSB modem (shown as "3ComProxy"). FIG. 14 shows a screen display in the host PC after the PPPoE application has received the PADO message back from "3ComProxy". Note that the available service endpoints "ISP" 50A and "Corp." 50C are displayed on the screen.

Step 2: Initiating a Dynamic Connection to a Remote Service Endpoint

Figure 16:
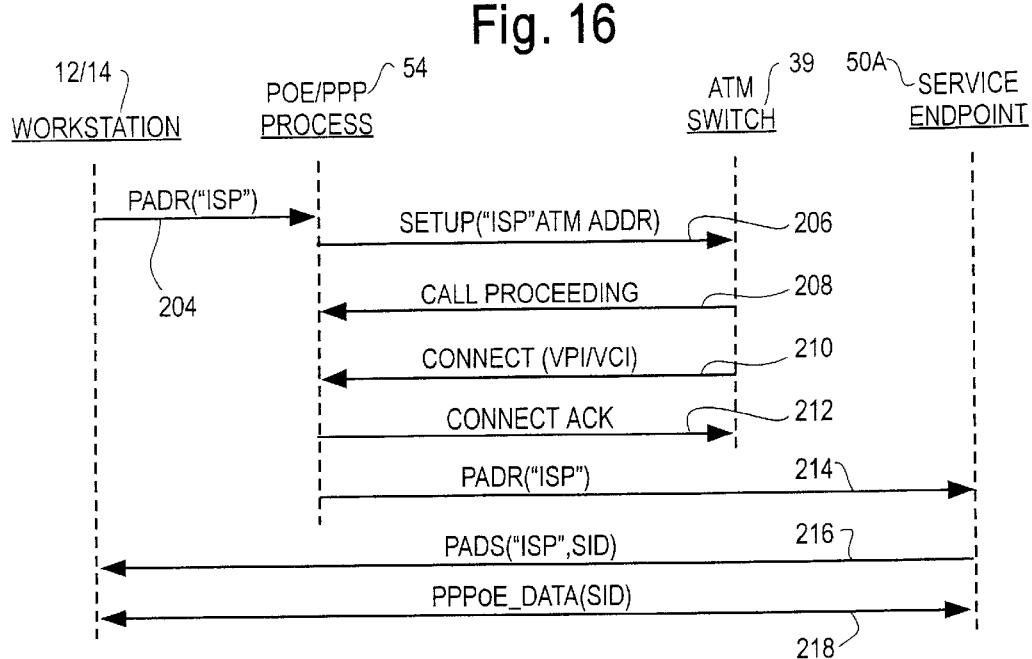
FIG. 16 is an illustration of the message exchange for a transparent switched virtual circuit call establishment message exchange between the PPPoE computer 12 or 14, the PPPoE/PPP process in the eUSB modem, and an ATM switch in the ATM network and the remote service endpoint.

After the PADO message 202 has been received by the computer 12, the user needs to initiate a connection to a specific service endpoint 50A or 50C before data passing can occur. Notice that host computer 12 (which does not support dynamic connections, in the illustrated embodiment) is totally unaware of the dynamic nature of the connections to the advertised service endpoints. FIG. 15 shows the screen displace on the computer 12, where the user has selected the Internet service provider endpoint "ISP" 50A. FIG. 16 shows the host computer 12 sending out the service endpoints connect request message PPPoE Active Discovery Request (PADR) 204 as defined in RFC 2516. In response, the eUSB modem 16 sets up a dynamic switched connection via messages 206, 208, 210, and 212, as specified in ITU-T Recommendation Q.2931 and ATM Forum Technical Specification, ATM User-Network Interface (UNI) Signaling Specification, version 4.0. The entire contents of these specifications is incorporated by reference herein.

The PADR message 204 is forwarded by the PPPoE/PPP process 54 to the service endpoint 50A as indicated at 214. A PPPoE Active Discovery Session (PADS) confirmation message 216 message containing the session identification is sent from the service endpoint to the computer 12. Note that upon completion of this dynamic call, the eUSB modem 16 could pass on the PADR message to the service endpoint (as shown in FIG. 16), or it could terminate the message and send back to the host computer 12 the PADS message, acting as the proxy for the remote service endpoint 50A in the case that the remote service endpoint does not support PPPoE. In either event, at this point a logical connection between the host computer 12 and the remote service endpoint 50A is established.

Step 3: Passing Data Between the Host Computer and the Service Endpoint

Figure 17:
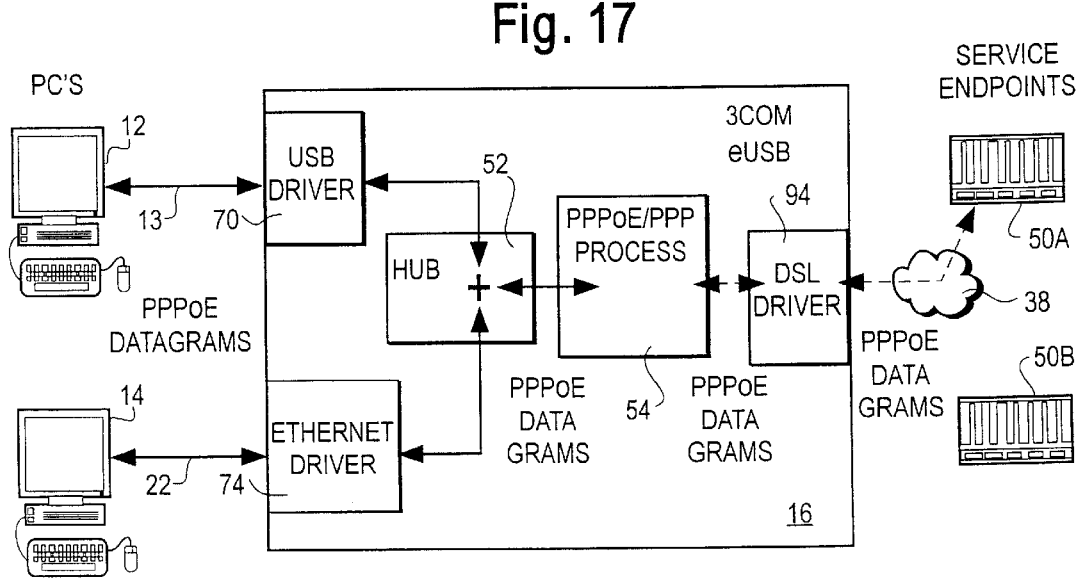
FIG. 17 is an illustration of the network connectivity between the computers 12 and 14, eUSB modem, and remote service endpoint after the computer has selected a connection to an ISP remote service endpoint, such as shown in FIG. 15 and 16.

Again referring to FIG. 16, the host computer will send and receive PPPoE datagrams between itself and the remote service endpoint, as indicated at 218. In FIG. 17, the host computer 12 will send PPPoE datagrams to the PPPoE/PPP proxy agent or software process 54 executing in the eUSB modem 16. The PPPoE/PPP process transparently forwards the host computer 12 datagrams over the dynamic connection to the remote service endpoint. Likewise, the PPPoE/PPP process 54 transparently forwards the service endpoint 50A PPPoE datagrams to the host computer 12. Any required conversion between PPPoE packets and PPP packets, such as where the remote service endpoint 50A does not support PPPoE, will be performed by the PPPoE/PPP process 54 as described previously.

Step 4: Terminating a Transparent Dynamic Connection to a Service Endpoint

To terminate the active session to the "ISP" service endpoint, the user needs to initiate the termination of the connection from the PPPoE application residing on the host computer 12. Notice that the host computer 12 (which does not support dynamic connections), is totally unaware of the dynamic nature of the connection to the service endpoint. A termination screen display (not shown) is brought up on the host computer's display giving the user the ability to terminate the connection. The user clicks on the icon to terminate the connection with the remote service endpoint "ISP" in the present example.

Figure 18:
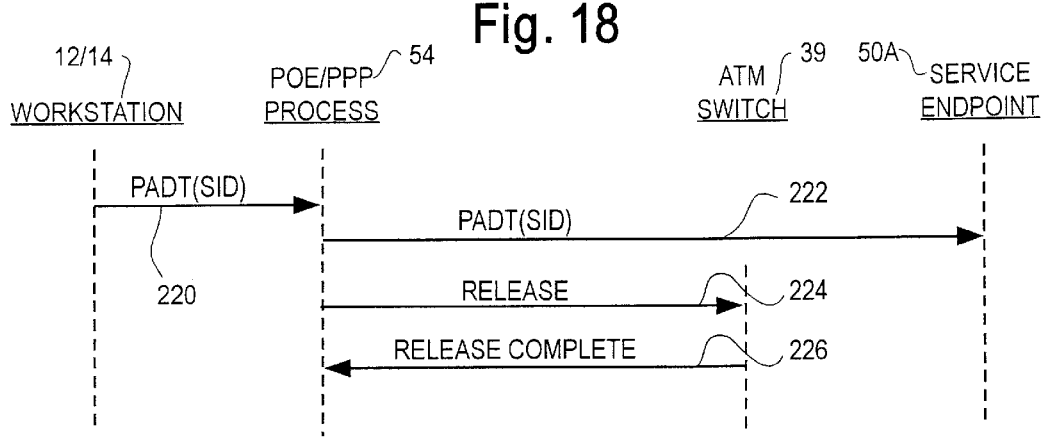
FIG. 18 is an illustration of the message flow during the teardown of the switched virtual circuit connection shown in FIG. 17.

FIG. 18 shows the host computer 12 sending out the service endpoint termination message PADT 220 as defined in RFC 2516. In response to this message, the eUSB modem first forwards the PADT message 220 along with the session 222 to the service endpoint 50A and then tears down the dynamic switched connection with the ATM switch 39 as defined in the Q.2319 and ADSL UNI Signalling specifications cited above, via release messages 224 and 226. At this point, the logical connection is terminated.

B. Advertisement, Control and Access to Management Interfaces Services for Client Workstation Referring now to FIGS. 6 and 22, the eUSB modem 16 further provides support for management endpoint advertisement within a data network when the network utilizes protocols that support the identification and connection to service endpoints, such as RFC 2516. The modem also provides support for route selection, transparent protocol conversion (as described herein), and termination of network protocols so that host computers 12 or 14 can communicate with the management endpoint within data communications equipment such as the eUSB modem 16. The illustrated embodiment converts PPPoE protocol packets to the PPP protocol and then terminates the PPP session within the PPPoE/PPP process 54 within the eUSB modem.

In accordance with the method, the host computer 12/14 (independent of whether it is located on the local or widearea side of the network) transmits and receives PPPoE packets over its respective interface. The PPPoE packets terminate in the eUSB modem 16. The PPPoE/PPP process 54 within the eUSB modem performs the advertising of the management endpoint, the route selection, the transparent protocol conversion (as discussed herein), and the termination of the PPP session to the host computer. Depending upon the action, the PPPoE/PPP process will either respond to the host computer that initiated the PPPoE packet or will convert and forward the translated packet (now a PPP packet) up to the PPP process 95 within the eUSB modem.

The PPP process 95 within the eUSB modem 16 will control and negotiate data networking parameters such as controlling authentication and assigning an IP address to the host computer for the duration of the mangement session as well as passing the mangement packets up the protocol stack in the eUSB modem to the management processes or application(s) (see FIG. 6, management application 90). In this example, the management protocol is Hyper Text Markup Language (HTML), which is encapsulated with UDP/IP headers. The IP/UDP 75, and HTML processes 92 within the eUSB modem forward the management packets.

Four steps are involved in the typical application will now be described.

1) The user sitting at the PC sends a query message seeking for all available service (in this case mangement) endpoints. The eUSB modem performs the advertisement of the management endpoint.
2) The user initiates a logical connection to the management endpoint. The eUSB modem performs route selection, transparent protocol conversion, data termination, and processing of the management packets.
3) Data packets are passed between the host computer and the processes 95, 75, 92 which control the access to the management endpoint 90 (FIG. 2) within the eUSB modem.
4) The logical connection to the management endpoint is terminated.

Step 1: Finding Out Which Mangement Services are Available

Figure 24:
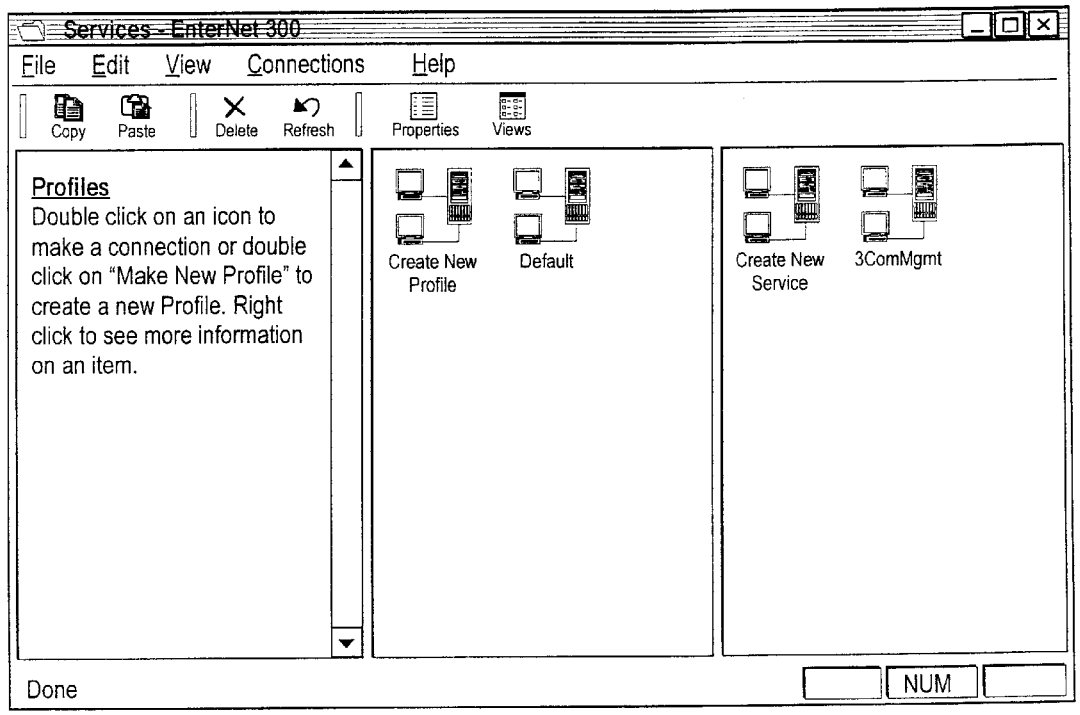
FIG. 24 is an illustration of the screen display on the computer 12 or 14 after it has queried for management endpoints in accordance with the message flow of FIG. 23.

The user must first initiate the PPPoE application on the host computer. FIG. 12 illustrates a sample screen snapshot before the service query has occurred. Once the application has loaded, the application will automatically initiate a query for all available services or will prompt the user to initiate the query. FIG. 23 shows the host computer sending out the service (or mangement) endpoints query message (PADI) as defined in RFC 2516. In response to the PADI, this eUSB modem responds with a PADO message (as defined in RFC 2516) that identifies the management endpoint that can be reached (via PPP) by terminating in the eUSB modem. This is one aspect of the proxy service of the invention. Notice that in our example, the PPP management endpoint "3ComMgmt" can be reached by attaching to the PPPoE/PPP process 54, which we have called "3Com-Proxy". FIG. 24 shows the updated screen snapshot after the PPPoE application on the host computer 12/14 has received the PADO message back from "3ComProxy".

Step 2: Initiating a Connection to the Management Endpoint

Figure 25:
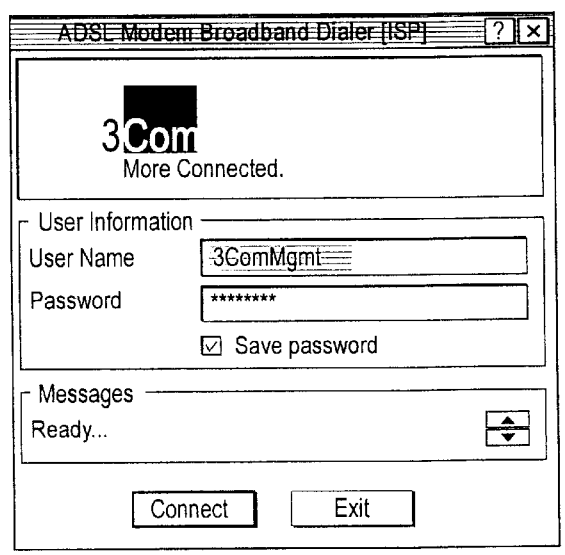
FIG. 25 is an illustration of the screen display on the computer 12 or 14 as it initiates a connection to the management endpoint "3ComMgmt" which is implemented in the eUSB modem.
Figure 26:
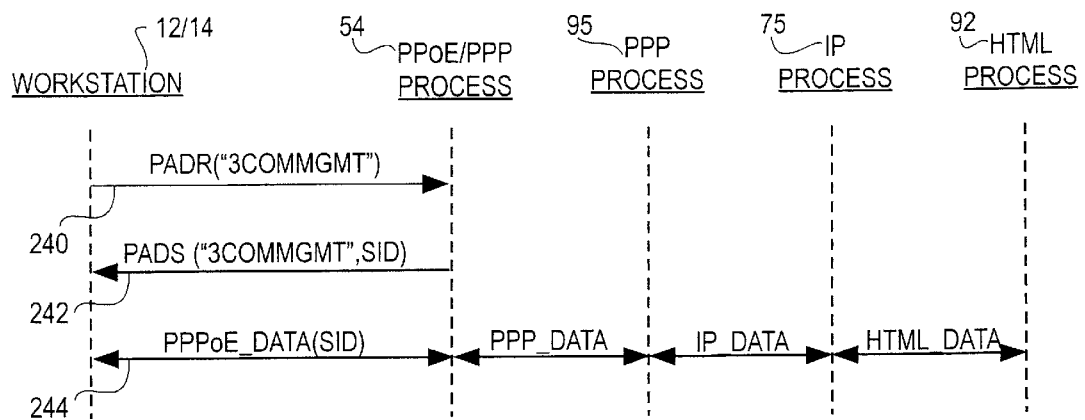
FIG. 26 is an illustration of the message flow between the entities of FIG. 24 for initiation of a management session between one of the computers of FIG. 22 and the HTML-based management entity in the eUSB modem.

Now the user needs to initiate a connection to the management endpoint before data passing can occur. FIG. 25 illustrates a connection screen for the service endpoint "3ComMgmt". FIG. 26 shows the host computer sending out the service (mangement) endpoint connect request message 240 (PADR) as defined in RFC 2516. The PPPoE/PPP process selects and saves the route that the data packets associated with this connection will take (internal PPP/IP/UDP/HTML processes) and responds with a connect acknowledge message (PADS) 242. At this point, the logical management connection is established.

Step 3: Passing Data Between the Host Computer and the Management Endpoint

Again referring to FIG. 26, the host computer will send PPPoE datagrams 244 to the PPPoE/PPP process 54 in the eUSB modem 16. This proxy feature of the PPPoE/PPP process transparently converts the PPPoE packets to PPP packets by stripping the PPPoE/Media Access Control (MAC) header from the Ethernet packet and forwards it to the internal PPP process 95, where it is passed via IP process 74 and HTML process 92 to the management application.

Management packets initiated within the eUSB modem will be sent via the HTML/UDP/IP processes to the PPP process 95. The PPP process 95 will prepend the PPP header to the received IP packet and send it to the PPPoE/PPP process 54. The PPPoe/PPP process will prepend the PPPoE and Ethernet MAC header to the received PPP packet and then forward it out the appropriate interface (to which the host computer is attached).

Step 4: Terminating a Connection to the Management Endpoint

To terminate the active session to "3ComMgmt", the user needs to initiate the termination of the connection from the PPPoE application residing on the host computer. A suitable termination screen is displayed on the user's screen and they click an icon to terminate the management connection.

Figure 27:
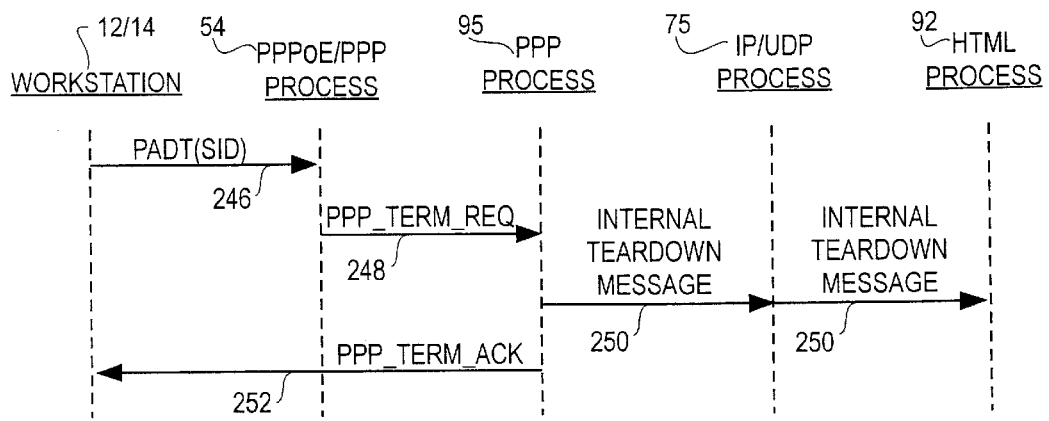
FIG. 27 is an illustration of the message flow showing the termination of the management connection between the PPPoE workstation and the HTML-based management entity.

FIG. 27 shows the host computer sending out the service (management) endpoints terminate request message (PADT) 246 as defined in RFC 2516. In response, the PPPoE/PPP process sends an internal teardown message (such as a PPP_Term_Req message 248) to the internal PPP process 95. In response, the PPP process 95 will send internal teardown messages 250 indications up the stack 75/92, causing all resources associated with the logical management 40 connection to be released. If the indication to the PPP process was a PPP_Term_Req message, the internal PPP process 95 may optionally send a PPP termination acknowledge message (PPP_Term_ACK) 252 to the PPP process located on the host computer 12/14. At this point, the logical management connection is terminated.

The eUSB modem is believed to be the first DSL product that provides a management of a data communications device via the PPPoE protocol, which by the pure nature of its operation, provides a very simple interconnect to manage data communications devices. Specifically, it removes the burden of the user having to know and configure IP addresses to attach to web-based management devices. The feature is very timely in that the PPPoE protocol is new to the market but is being embraced by broadband technologies as a preferred method to interconnect to service endpoints. The PPPoE management feature augments the use of this protocol to attach to management services within a data communications device. This provides a significant ease of use advantage to the customer.

Appendix

Hub Process 52 Source Code Listing

Notice Regarding Copyright

A portion of the disclosure of this patent document contains material which is subject to copyright protection. The copyright owner has no objection to the facsimile reproduction by anyone of the patent document or the patent disclosure as it appears in the Patent and Trademark Office files and records, but otherwise reserves all copyright rights whatsoever.

```
/*
 *   hub.c
 *
 *   Description: This module contains the HUB data path processing routines.
 *
 *
 *   +---------------------------------------------------------------------+
 *   |   Copyright © 1999 3Com Corporation, Santa Clara, CA.               |
 *   |                                                                     |
 *   |   The information in this software is subject to change without notice |
 *   |   and should not be construed as a commitment by U.S. Robotics Access |
 *   |   Corp.                                                             |
 *   |                                                                     |
 *   |   3Com Corporation assumes no responsibility for the use or         |
 *   |   reliability of its software on equipment which is not supplied by |
 *   |   3Com Corporation.                                                 |
 *   |                                                                     |
 *   |   This software is furnished under a license and may be copied only |
 *   |   with the inclusion of the above copyright notice. This software, or |
 *   |   any other copies thereof, may not be provided or otherwise made    |
 *   |   available to any other person except to one who agrees to these    |
 *   |   license terms. Title to and ownership of the software shall at all |
 *   |   times remain in 3Com Corporation.                                 |
 *   +---------------------------------------------------------------------+
 *
 *   Author:      Joe Kralowetz
 *
 *   Date:        19-May-99
 *
 */
/********************************************************************************
 *
 *   Function:    hub_rx_pkt_from_ethernet_or_usb
 *
 *   Call:
 *       hub_rx_pkt_from_ethernet_or_usb(PDB *p_pdb, ExecBuff p_pkt)
 *
 *   Arguments:
 *       p_pdb       - Ptr to the PDB
 *       p_pkt       - Ptr to the received buffer
 *
 *   Return Value:
 *       None
 *
 *   Description:
 *       Check the received packet to see if we want to process it.
 *
 ********************************************************************************/
Boolean
hub_rx_pkt_from_ethernet_or_usb(PDB *p_pdb, ExecBuff p_pkt)
{
    HUBPort     *p_rxport, *p_txport;
    EtherHdr_t  *p_epkt;
    FDB_t       *p_srcFDB = NULL;
    FDB_t       *p_destFDB;
    Uint16      da[3];
    Uint16      sa[3];
        /* Set ptrs before processing */
        p_rxport = (HUBPort *)p_pdb->pdb_protocol_specific;
        /* Can data to be passed up thru this portal? */
        /* (If not, eat the packet) */
        if (p_rxport->manually_disabled || (p_pdb->portal_state != PDB_ENABLED))
        {
            free_buffer(p_pkt);
            return(TRUE);
        }
        p_epkt = (EtherHdr_t *) BUFFER_PTR(p_pkt);
        /* Action depends on RX port (USB/Ether) and pkt type (Uni/BC pkt) */
        if ((GET_IFTYPE(p_pdb)) == ifType_ethernetCsmacd)
        {
            if (hub_data.lan_to_lan_disabled)
            {
                /* pass it up the stack */
                hub_send_pkt_upstairs(p_pkt, FALSE);
            }
            else
            {
                if (hub_data.using_fdb)
                {
```

-continued

```
                /** Learn the Source Mac Address **/
                /* copy the addresses to Uint16s, LSB first order */
                sa[0] = (p_epkt—>src[0] << 8) | (p_epkt—>src[1]);
                sa[1] = (p_epkt—>src[2] << 8) | (p_epkt—>src[3]);
                sa[2] = (p_epkt—>src[4] << 8) | (p_epkt—>src[5]);
                /* find (or make) the Source FDB entry */
                p_srcFDB = hub_FDB_learn(sa[0], sa[1], sa[2]);
                /** Update srcFDB entry fields **/
                if (!p_srcFDB—>InUseFlag)
                {
                    /* New Dynamic Station only */
                    p_srcFDB—>InUseFlag = TRUE;
                }
                /* Update Age */
                p_srcFDB—>Age = HubSystem_Time;
            }
            /* Is this is a BC/MC pkt */
            if (p_epkt—>dst[0] & U8_BCAST_MCAST)
            {
                /* pass it up the stack */
                hub_send_pkt_upstairs(p_pkt, TRUE);
                /* and out the USB */
                p_txport = hub_get_port_by_type(PTT_USB);
                /* Can data to be passed up thru this portal? */
                /* (If not, eat the packet) */
                if (p_txport)
                {
                    hub_tx_pkt_to_ethernet_or_usb(p_txport—>p_pdb, p_pkt);
                }
                else
                {
                    /* No USB port, release the packet */
                    free_buffer(p_pkt);
                }
            }
            else    /* Unicast pkt from Ethernet Port */
            {
        /* Is this destined for the USB? */
        if (memcmp(p_epkt—>dst, &hub_data.usb_mac_addr,
            sizeof(MacAddr_t)) == 0)
                {
                    /* send pkt out USB port */
                    p_txport = hub_get_port_by_type(PTT_USB);
                    /* Can data to be passed up thru this portal? */
                    /* (If not, eat the packet) */
                    if (p_txport)
                    {
                        hub_tx_pkt_to_ethernet_or_usb(p_txport—>p_pdb, p_pkt);
                    }
                    else
                    {
                        /* No USB port, release the packet */
                        free_buffer(p_pkt);
                    }
                }
                else
                {
                    /* send pkt upstairs */
                    hub_send_pkt_upstairs(p_pkt, FALSE);
                }
            }
        }
    }
}
else      /* came in USB port */
{
    if (hub_data.lan_to_lan_disabled)
    {
        /* pass it up the stack */
        hub_send_pkt_upstairs(p_pkt, FALSE);
    }
    else
    {
        /* Check for BC/MC pkt OR if we are NOT using the FDB */
        if ((p_epkt—>dst[0] & U8_BCAST_MCAST) || (!hub_data.using_fdb))
        {
            /* In this case (BC/MC or NOT using FDB), logic is the */
            /* same. Send the pkt upstairs and out the Ethernet */
            /* pass it up the stack */
            hub_send_pkt_upstairs(p_pkt, TRUE);
```

```
            /* and out the Ethernet */
            p_txport = hub_get_port_by_type(PTT_ETHERNET);
            /* Can data to be passed up thru this portal? */
            /* (If not, eat the packet) */
            if (p_txport)
            {
                hub_tx_pkt_to_ethernet_or_usb(p_txport—>p_pdb, p_pkt);
            }
            else
            {
                /* No Ethernet port, release the packet */
                free_buffer(p_pkt);
            }
        }
        else    /* Unicast pkt from USB AND we are using the FDB */
        {
            /* copy the addresses to Uint16s, LSB first order */
            da[0] = (p_epkt—>dst[0] << 8) | (p_epkt—>dst[1]);
            da[1] = (p_epkt—>dst[2] << 8) | (p_epkt—>dst[3]);
            da[2] = (p_epkt—>dst[4] << 8) | (p_epkt—>dst[5]);
            /* find the Dest FDB entry */
            p_destFDB = hub_FDB_find(da[0], da[1], da[2]);
                /* This go upstairs if not found in Ethernet FDB */
                if (p_destFDB == NULL)
                {
                    /* pass it up the stack */
                    hub_send_pkt_upstairs(p_pkt, TRUE);
                }
                /* ALWAYS out the Ethernet */
                p_txport = hub_get_port_by_type(PTT_ETHERNET);
                /* Can data to be passed up thru this portal? */
                /* (If not, eat the packet) */
                if (p_txport)
                {
                    hub_tx_pkt_to_ethernet_or_usb(p_txport—>p_pdb, p_pkt);
                }
                else
                {
                    /* No Ethernet port, release the packet */
                    free_buffer(p_pkt);
                }
            }
        }
    }
    return(TRUE);
}
/*****************************************************************************
*
*   Function: hub_snd_pkt_upstairs - process incoming host packet.
*
*   Call:
*       hub_snd_pkt_upstairs(ExecBuff p_pkt, Boolean copyflag)
*
*   Arguments:
*       p_pkt           - Pointer to received ExecBuff.
*       copyflag        - TRUE if we are to copy this pkt
*
*   Return Value:
*       None
*
*   Description:
*       This function is called when a received packet is destined for a
*       protocol process (above us)
*
+*****************************************************************************/
void
hub_send_pkt_upstairs(ExecBuff p_pkt, Boolean copyflag)
{
    ExecBuff        p_uppkt;
    ListHeader      *p_list;
    PDB             *p_pdb;
    /****
    * Check each forwarder associated with the Ethernet to see if
    * it will accept the frame.
    ****/
    /* Ethernet PDB List */
    p_list = &(hub_data.fwdr_pdb_list_e2);
    /* Don't waste time on copy if list is empty */
    if ((EXEC_LIST_HEAD(p_list)) == NULL)
```

-continued

```
        {
            /* No PDB on Frame list, Pkt dropped. */
            if (!copyflag)
                free_buffer(p_pkt);
            return;
        }
    }
    /****
    * Do we need to copy the packet into a new buffer?
    ****/
    if (copyflag)
    {
        p_uppkt = get_buffer(buffer_size(p_pkt));
        /* copy the data into the new data packet */
        copy_buffer(p_pkt, BUFFER_PTR(p_uppkt), buffer_size(p_pkt));
    }
    else
    {
        p_uppkt = p_pkt;
    }
    /****
    * Call the receive function for each portal with this encapsulation.
    * If one returns TRUE, it has accepted the frame and we are done.
    ****/
    for (p_pdb = EXEC_LIST_HEAD(p_list);
         p_pdb != NULL;
         p_pdb = EXEC_LIST_NEXT(&p_pdb—>pdb_icb_list))
    {
        if ((p_pdb—>pdb_portal_receive.buffer_routine)
            (p_pdb, p_uppkt, (void *)NULL))
        {
            break;
        }
    }
    if (p_pdb == NULL)
    {
        /****
        * None of the portals accepted this message!
        * Try to send it to the bridge portal.
        ****/
        for (p_pdb = EXEC_LIST_HEAD(&hub_data.fwdr_pdb_list_bridge);
             p_pdb != NULL;
             p_pdb = EXEC_LIST_NEXT(&p_pdb—>pdb_icb_list))
        {
            if ((p_pdb—>pdb_portal_receive.buffer_routine)
                (p_pdb, p_uppkt, (void *)NULL))
            {
                break;
            }
        }
    }
    /*
    * Note: This will free either the copied packet or the
    *       passed in pkt (if no copy) if no one upstairs took it.
    */
    if (p_pdb == NULL)
    {
        free_buffer(p_uppkt);
    }
}
/******************************************************************************
*
*    Function: hub_tx_pkt_from_upstairs - Entry point for Forwarder TX
*
*    Call:
*        hub_queue_tx(InterfaceCB *p_icb, PDB *p_fwdr_pdb,
*            ExecBuff p_fwdr_pkt, DrvPriority_t pri)
*
*    Arguments:
*        p_icb         - Pointer to Hub's Forwarder ICB (for Mgmt).
*        p_fwdr_pkt    - Pointer to packet to TX.
*        pri           - Priority of the packet. Not currently used.
*        p_pdb         - Pointer to Forwarder's PDB (related to this pkt).
*
*    Return Value:
*        None
*
*    Description:
*        Execute the tx processing of the protocol. Simply hand down the stack.
*
```

-continued

```
/*****************************************************************/
Int32
hub_tx_pkt_from_upstairs(InterfaceCB *p_icb, ExecBuff p_fwdr_pkt,
    DrvPriority_t pri, void *p_void_pdb)
{
    EtherHdr_t    *p_epkt;
    ExecBuff      p_rep_pkt;
    HUBPort       *p_usbport, *p_ethport;
    /* Make sure that there is really a valid lower half of this icb . . . */
    if ((p_icb == NULL) || (p_fwdr_pkt == NULL) ||
        (p_icb—>icb_state != DRV_ACTIVE))
    {
        free_buffer(p_fwdr_pkt);
        return(-1);
    }
    p_epkt = (EtherHdr_t *) BUFFER_PTR(p_fwdr_pkt);
    /* Is this is a BC/MC pkt */
    if (p_epkt—>dst[0] & U8_BCAST_MCAST)
    {
        /* get both port ptrs */
        p_usbport = hub_get_port_by_type(PTT_USB);
        p_ethport = hub_get_port_by_type(PTT_ETHERNET);
        /* Can data to be passed down thru this portal? */
        if (p_usbport && p_ethport)
        {
            /* Bummer, both ports are alive and kickin'. We need */
            /* to replicate the buffer. */
            /* replicate the data portion of the pkt */
            p_rep_pkt = replicate_buffer(p_fwdr_pkt);
            /** send replicated buffer out Ethernet **/
            hub_tx_pkt_to_ethernet_or_usb(p_ethport—>p_pdb, p_rep_pkt);
            /** Now out the USB port **/
            hub_tx_pkt_to_ethernet_or_usb(p_usbport—>p_pdb, p_fwdr_pkt);
        }
        else
        {
            /* If here, at most one of the ports is active. Send */
            /* the original pkt (without copy) out that port. */
            if (p_usbport)
            {
                /** Out the USB port **/
                hub_tx_pkt_to_ethernet_or_usb(p_usbport—>p_pdb, p_fwdr_pkt);
            }
            else if (p_ethport)
            {
                /** Out the Ethernet port **/
                hub_tx_pkt_to_ethernet_or_usb(p_ethport—>p_pdb, p_fwdr_pkt);
            }
        }
    }
    else    /* Unicast pkt from above */
    {
        /** Now process the Unicast pkt from above **/
        /* Is this destined for the USB? */
        if (memcmp(p_epkt—>dst, &hub_data.usb_mac_addr,
            sizeof(MacAddr_t)) == 0)
        {
            /* send pkt out USB port */
            p_usbport = hub_get_port_by_type(PTT_USB);
            /* Can data to be passed up thru this portal? */
            /* (If not, eat the packet) */
            if (p_usbport)
            {
                hub_tx_pkt_to_ethernet_or_usb(p_usbport—>p_pdb, p_fwdr_pkt);
            }
        }
        else
        {
            /* send pkt out Ethernet port */
            p_ethport = hub_get_port_by_type(PTT_ETHERNET);
            /* Can data to be passed up thru this portal? */
            /* (If not, eat the packet) */
            if (p_ethport)
            {
                hub_tx_pkt_to_ethernet_or_usb(p_ethport—>p_pdb, p_fwdr_pkt);
            }
        }
    }
    return(LONG_MAX);
```

```
-continued

}
/******************************************************************************
*
*   Function: hub_tx_pkt_to_ethernet_or_usb
*
*   Call:
*       hub_tx_pkt_to_ethernet_or_usb(PDB *p_pdb, ExecBuff buff)
*
*   Arguments:
*       p_pdb       - Ptr to the PDB
*       buff        - Ptr to the received buffer
*
*   Return Value:
*       None
*
*   Description:
*       Check the received packet to see if we want to process it.
*
******************************************************************************/
Boolean
hub_tx_pkt_to_ethernet_or_usb(PDB *p_pdb, ExecBuff buff)
{
    HUBPort     *p_port;
    Int32       ret;
    /* Sorry, no encapsulation is necessary here, so get on with it . . . */
    /* Set ptrs before processing */
    p_port = (HUBPort *)p_pdb->pdb_protocol_specific;
    /* Can data to be passed up thru this portal? */
    /* (If not, eat the packet) */
    if (p_port->manually_disabled || (p_pdb->portal_state != PDB_ENABLED))
    {
        ret = -1;
    }
    else
    {
        /* Call the icb queue routine. This gets the packet into the */
        /* network layer process such as IP, etc. */
        ret = (p_pdb->pdb_net_data.icb_ptr->icb_queue.buffer_routine)
                    (p_pdb->pdb_net_data.icb_ptr, buff, DrvHi, p_pdb);
    }
    /* if error, free the packet */
    if (ret < 0)
    {
        free_buffer(buff);
        return(FALSE);
    }
    else
        return(TRUE);
}
```

Presently preferred embodiments of the invention, and the best mode contemplated for practicing the invention have been described with particularity. However, persons skilled in the art will recognize that departure from the detailed description of hardware and software set forth herein can be made without departure from the true spirit and scope of the invention. This true spirit and scope is to be determined by reference to the appended claims, interpreted in light of the foregoing.

We claim:

1. A method of providing transparent support for a protocol for a remote service endpoint, comprising the steps of:

implementing a proxy engine in a computing platform associated with a host computer system;

receiving a message from said host computer system in accordance with said protocol at said proxy engine, said message intended to be transmitted to and responded by said remote service endpoint;

said proxy engine responding to said message for said remote service endpoint and implementing a portion of the protocol intended to be implemented by said remote service endpoint, whereby said proxy engine provides support for said protocol for said remote service endpoint in a manner transparent to said host computer system.

2. The method of claim 1, wherein said proxy engine is implemented in a computing platform in a data communications equipment connected to said host computer system.

3. The method of claim 2, wherein said data communications equipment comprises an ADSL modem and wherein said protocol comprises PPPoE (Point to Point Protocol over Ethernet).

4. The method of claim 1, wherein said proxy engine further comprises a packet translation engine converting packets in accordance with said protocol to a second format in accordance with a second protocol.

5. The method of claim 4, wherein said protocol comprises PPPoE (Point to Point Protocol over Ethernet), and wherein said second protocol comprises PPP (Point to Point Protocol), said packet translation engine converting packets from PPPoE protocol to PPP protocol.

6. A method of providing transparent support for a PPPoE (Point to Point Protocol over Ethernet) protocol for a remote service endpoint, comprising the steps of:

sending a query message from a host computer to a data communications equipment connected to said host computer seeking the identification of all available service endpoints;

said data communications equipment responding to said query and identifying a service endpoint that can be accessed by said data communications equipment;

initiating a connection to said service endpoint;

passing data between said host computer and said service endpoint; and terminating said connection to said service endpoint.

7. The method of claim 6, wherein said step of passing data further comprises the step of converting packets from a first protocol form to a second protocol form in said data communications equipment.

8. The method of claim 6, wherein said data communications equipment comprises a asymmetric digital subscriber line (ADSL) modem.

9. The method of claim 7, wherein said first protocol form comprises a PPPoE format and wherein said second protocol form comprises a PPP format.

10. An Asymmetric Digital Subscriber Line (ADSL) modem for a host computer system, comprising:

a central processing unit;

an interface to an Ethernet network;

an interface to a telephone line;

a proxy engine providing transparent support for the PPPoE protocol for a remote service endpoint, wherein said proxy engine provides a software routine responding to query messages from said host computer system seeking an identification of a remote service endpoint by identifying a service endpoint that can be accessed by said modem;

said proxy engine initiating a connection to said service endpoint, passing data between said host computer system and said service endpoint, and terminating said connection to said service endpoint.

11. The ADSL modem of claim 10, wherein said modem further comprises a USB interface for connecting said modem to a second general purpose computer, and a software hub enabling said host computer system and second general purpose computer to share files or attached peripheral devices.

12. The ADSL modem of claim 10, wherein said ADSL modem provides transparent support for the establishment and tear-down of dynamic switched virtual circuit connections between said host computer connected to the modem and a remote service endpoint.

13. The ADSL modem of claim 12, wherein said dynamic switched virtual circuits are within an asynchronous transfer mode (ATM) network.

* * * * *